US012734822B2

(12) United States Patent
Morikawa

(10) Patent No.: US 12,734,822 B2
(45) Date of Patent: Sep. 15, 2026

(54) COLORIMETRY SYSTEM AND PRINTING DEVICE FOR MEASURING COLORS IN PRINTED MATTER

(71) Applicant: BROTHER KOGYO KABUSHIKI KAISHA, Nagoya (JP)

(72) Inventor: Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 403 days.

(21) Appl. No.: 18/324,273

(22) Filed: May 26, 2023

(65) Prior Publication Data

US 2023/0382128 A1 Nov. 30, 2023

(30) Foreign Application Priority Data

May 31, 2022 (JP) ................................ 2022-088197

(51) Int. Cl.
*B41J 2/21* (2006.01)
*G01N 21/25* (2006.01)

(52) U.S. Cl.
CPC .......... *B41J 2/2132* (2013.01); *G01N 21/251* (2013.01); *G01N 2201/127* (2013.01)

(58) Field of Classification Search
CPC .................. B41J 2/2132; B41J 29/393; B41J2 029/3935; B41J 29/38; G01N 21/251; G01N 2201/127; G01N 21/253; G01J 3/524; G01J 3/52
See application file for complete search history.

(56) References Cited

U.S. PATENT DOCUMENTS

| | | | | |
|---|---|---|---|---|
| 2007/0229870 | A1* | 10/2007 | Doi | H04N 1/6033 358/1.9 |
| 2015/0350493 | A1* | 12/2015 | Sakatani | H04N 1/6052 358/504 |
| 2017/0104884 | A1 | 4/2017 | Hayashi et al. | |
| 2020/0298586 | A1* | 9/2020 | Arazaki | H04N 1/00082 |
| 2022/0137888 | A1* | 5/2022 | Nagahara | G06F 3/1253 358/1.5 |

FOREIGN PATENT DOCUMENTS

| | | | |
|---|---|---|---|
| JP | 2010-157920 | A | 7/2010 |
| JP | 2011131383 | A | 7/2011 |
| JP | 2014-093652 | A | 5/2014 |
| JP | 2017073730 | A | 4/2017 |
| WO | 2020152865 | A1 | 7/2020 |

* cited by examiner

*Primary Examiner* — Jannelle M Lebron
(74) *Attorney, Agent, or Firm* — Scully, Scott, Murphy & Presser, P.C.

(57) ABSTRACT

A colorimetry system includes: a color measuring unit; a moving unit; and a controller. The controller executes a color measuring operation for a plurality of patches included in a patch chart printed on a print medium on the basis of patch information. The plurality of patches includes a first patch; and a second patch. The patch information includes information on the first patch and the second patch. The color measuring operation includes: a first color measuring operation; and a second color measuring operation. The first color measuring operation measures a color of the first patch with the color measuring unit while the moving unit moves the color measuring unit relative to the print medium. The second color measuring operation measures a color of the second patch with the color measuring unit while the moving unit does not move the color measuring unit relative to the print medium.

8 Claims, 19 Drawing Sheets

FIG. 3

| No. | PATCH TYPE | PATCH POSITION | COLOR VALUE | | | COLORIMETRIC VALUE | | |
|---|---|---|---|---|---|---|---|---|
| | | | R | G | B | L | a | b |
| 1 | FIRST PATCH | 1st COLUMN 1st ROW | 0 | 0 | 0 | | | |
| 2 | FIRST PATCH | 1st COLUMN 2nd ROW | 7 | 0 | 0 | | | |
| ... | ... | ... | ... | ... | ... | ... | ... | ... |
| 729 | FIRST PATCH | 21st COLUMN 9th ROW | 255 | 255 | 255 | | | |
| 730 | SECOND PATCH | 22nd COLUMN 1st ROW | 255 | 160 | 80 | | | |
| 731 | SECOND PATCH | 22nd COLUMN 2nd ROW | 255 | 160 | 32 | | | |
| 732 | SECOND PATCH | 22nd COLUMN 3rd ROW | 255 | 176 | 80 | | | |
| ... | ... | ... | ... | ... | ... | ... | ... | ... |
| 780 | SECOND PATCH | 23rd COLUMN 14th ROW | 128 | 64 | 60 | | | |

110
151(150)
161
B
116
160
REAR
LEFT
RIGHT
FRONT
117
162
141
141
141
141
140
164
163
165
151(150)
e2
e1
e3
e20
e22
e21
e23
f1
f2
f3
C1
111
128a(128)
125
C2
118
123
124
120
127a(127)
126a(126)
121
A
B
C
122
C0
130
CONTROL UNIT
f34
f35
f36
C1
C2

110
151(150)
161
B
116
160
REAR
LEFT
RIGHT
FRONT
117
162
141
141
141
141
140
164
163
165
151(150)
B1
125
124
e1
e2
e3
C2
C2
e9
e14
C2
C2
C0
e34
e35
e36
118
118
118
118
123
120
f23
f22
f21
f20
C1
C1
128a(128)
111
126a(126)
A
B
C
121
127a(127)
122
C1
C1
130
CONTROL UNIT
f3
f2
f1
B2
C1
C1
C1
C1
C1
C1

COLORIMETRY SYSTEM AND PRINTING DEVICE FOR MEASURING COLORS IN PRINTED MATTER

REFERENCE TO RELATED APPLICATIONS

This application claims priority from Japanese Patent Application No. 2022-088197 filed on May 31, 2022. The entire content of the priority application is incorporated herein by reference.

BACKGROUND ART

The information processing device disclosed in Japanese Patent Application Publication No. 2010-157920 is one example of a conventional colorimetry system for measuring colors in printed matter. This information processing device extracts all colors represented by the data to be printed and acquires the percentage of the printing area occupied by each color. The information processing device generates image data representing images of color patches for calibration (hereinafter referred to as "calibration patches") based on these percentages and prints the images of the calibration patches using a printer. Next, the information processing device uses a colorimeter to measure the colors of the printed calibration patches and calibrates the image data to be used for printing on the basis of this colorimetric data.

DESCRIPTION

The conventional information processing device described above measures printed calibration patches with a colorimeter and calibrates image data to be used for printing on the basis of this colorimetric data. However, using the same measurement method uniformly for all calibration patches may take an excessive amount of time or, conversely, result in substandard accuracy.

In view of the foregoing, it is an object of the present disclosure to provide a colorimetry system and a printing device for measuring colors in printed matter that can achieve an optimal balance between processing time and accuracy in the measurement of color patches.

In order to attain the above and other object, according to one aspect, the present disclosure provides a colorimetry system. The colorimetry system includes: a color measuring unit; a moving unit; and a controller. The color measuring unit is configured to measure a color of each of a plurality of patches included in a patch chart printed on a print medium. The moving unit is configured to move the color measuring unit relative to the print medium. The controller is configured to execute a color measuring operation for the plurality of patches on the basis of patch information. The plurality of patches includes: a first patch; and a second patch. The first patch has a first color. The second patch has a second color. The patch information includes information on the first patch and the second patch. The color measuring operation includes: a first color measuring operation; and a second color measuring operation. The first color measuring operation is to measure a color of the first patch with the color measuring unit while the moving unit moves the color measuring unit relative to the print medium. The second color measuring operation is to measure a color of the second patch with the color measuring unit while the moving unit does not move the color measuring unit relative to the print medium.

According to another aspect, the present disclosure also provides a printing device. The printing device includes: a head; a first carriage; a conveying unit; a color measuring unit; and a controller. The head has a nozzle. The nozzle is configured to eject ink onto a print medium. The first carriage is configured to support the head. The first carriage is movable in a first direction. The conveying unit is configured to convey the print medium in a second direction crossing the first direction. The color measuring unit is configured to measure a color of each of a plurality of patches included in a patch chart printed on the print medium. The plurality of patches includes: a first patch; and a second patch. The first patch has a first color. The second patch has a second color. The controller is configured to execute: a printing operation; and a color measuring operation. The printing operation is to print the patch chart on the print medium with ink ejected from the head. The color measuring operation is executed for the plurality of patches on the basis of patch information. The patch information includes information on the first patch and the second patch. The color measuring operation includes: a first color measuring operation; and a second color measuring operation. The first color measuring operation is to measure a color of the first patch with the color measuring unit while the conveying unit moves the print medium relative to the color measuring unit. The second color measuring operation is to measure a color of the second patch with the color measuring unit while the conveying unit does not move the print medium relative to the color measuring unit.

According to still another aspect, the present disclosure also provides a printing device. The printing device includes: a head; a first carriage; a conveying unit; a color measuring unit; a second carriage; and a controller. The head has a nozzle. The nozzle is configured to eject ink onto a print medium. The first carriage is configured to support the head. The first carriage is movable in a first direction. The conveying unit is configured to convey the print medium in a second direction crossing the first direction. The color measuring unit is configured to measure a color of each of a plurality of patches included in a patch chart printed on the print medium. The second carriage is configured to support the color measuring unit. The second carriage is movable in the first direction. The plurality of patches includes: a first patch; and a second patch. The first patch has a first color. The second patch has a second color. The controller is configured to execute: a printing operation; and a color measuring operation. The printing operation is to print the patch chart on the print medium with ink ejected from the head. The color measuring operation is executed for the plurality of patches on the basis of patch information. The patch information includes information on the first patch and the second patch. The color measuring operation includes: a first color measuring operation; and a second color measuring operation. The first color measuring operation is to measure a color of the first patch with the color measuring unit while the second carriage moves in the first direction. The second color measuring operation is to measure a color of the second patch with the color measuring unit while the second carriage halts in the first direction.

With the above configuration, a colorimetry system and a printing device for measuring colors in printed matter can be provided that can achieve an optimal balance between processing time and accuracy in the measurement of color patches.

FIG. 3 is an explanatory diagram of patch information stored in a storage unit.

Hereinafter, specific embodiments of the present disclosure will be described while referring to the accompanying drawings. In the following description, the same or corresponding elements are designated with the same reference symbols throughout the drawings.

Figure 1:
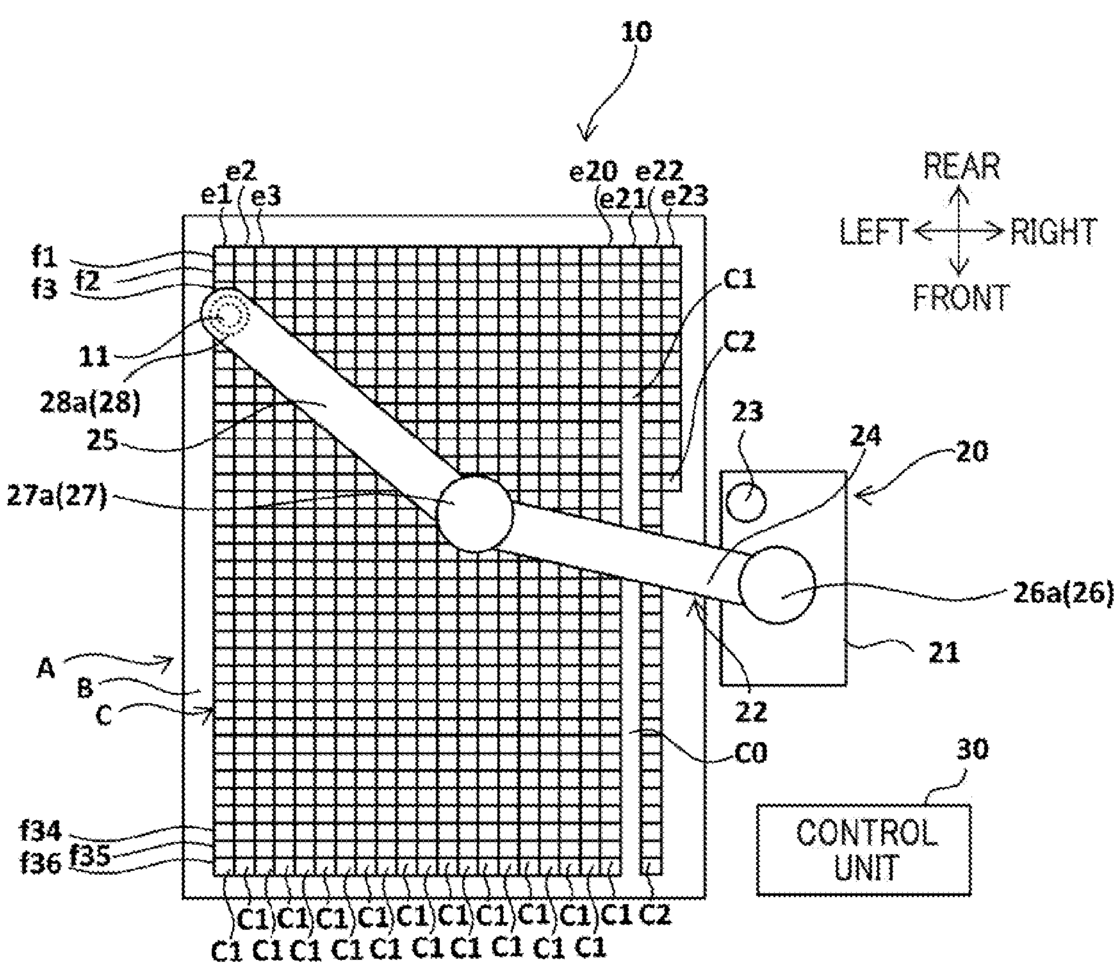
FIG. 1 illustrates a schematic plan view of an example of a colorimetry system for printed matter.

FIG. 1 illustrates an example of a colorimetry system 10 according to a first embodiment of the present disclosure. The colorimetry system 10 measures the colors of color patches (hereinafter simply referred to as "patches") in a patch chart C or other image that has been printed on a print medium B. The print medium B on which the patch chart C or other image has been printed will be called printed matter A. The colorimetry system 10 is provided with a color measuring unit 11 that measures the colors of a plurality of patches in the patch chart C printed on the print medium B, a moving unit 20 that moves the color measuring unit 11 relative to the patch chart C, and a control unit 30.

The directions in which the moving unit 20 moves the color measuring unit 11 cross one another (e.g., orthogonally). Below, these directions will be called the left-right, front-rear, and up-down directions, but the arrangement of the colorimetry system 10 is not limited to these directions. Note that the directions orthogonal to the up-down direction, which include the front-rear and left-right directions, may also be referred to as horizontal directions. The control unit 30 will be described later in greater detail.

Figure 2:
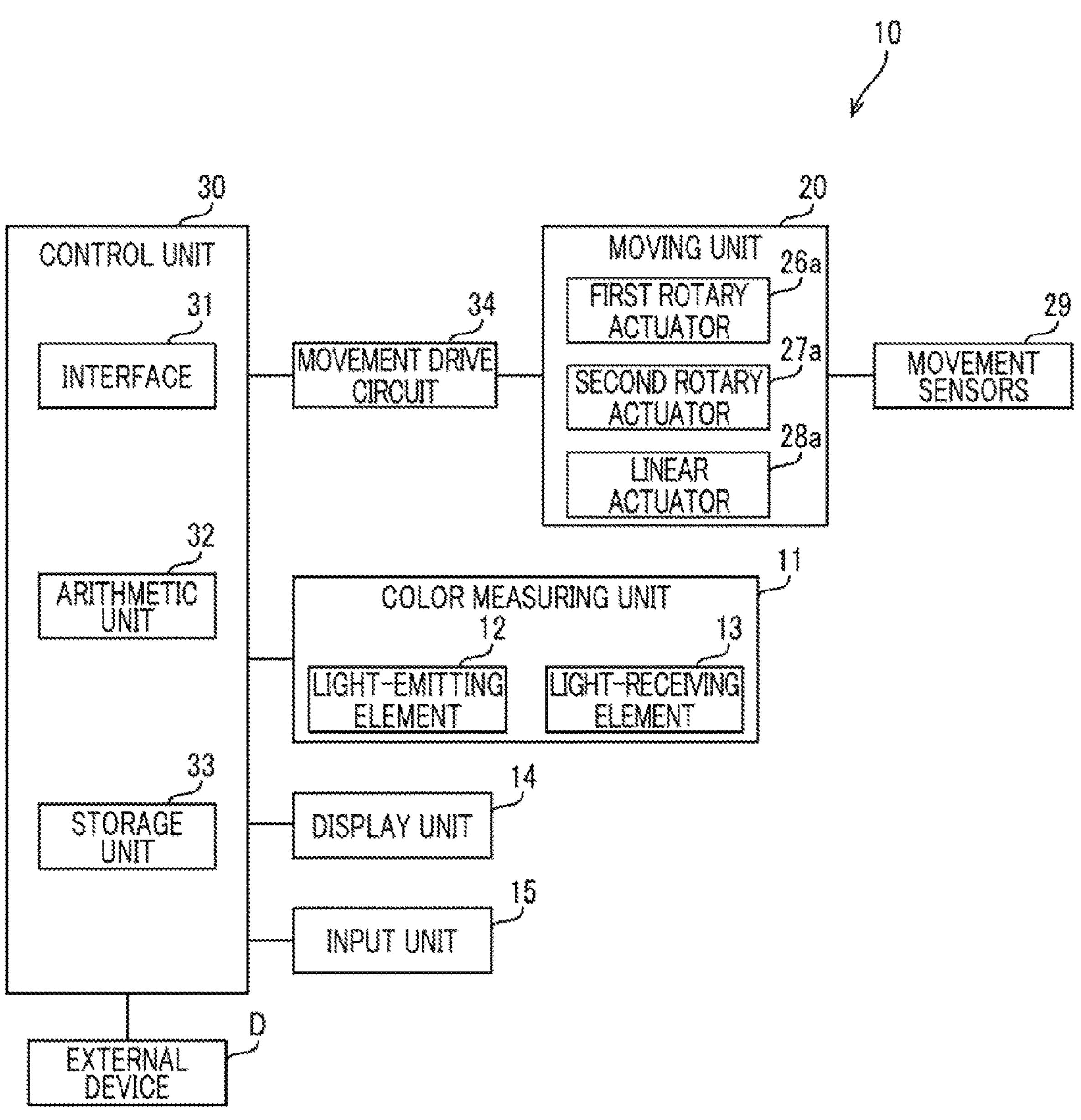
FIG. 2 is a block diagram illustrating the functional structure of the colorimetry system for printed matter illustrated in FIG. 1.

The color measuring unit 11 is a spectrophotometer and a colorimeter, for example, and has a light-emitting element 12 and a light-receiving element 13 (see FIG. 2). The light-emitting element 12 is a light source such as an illuminant D65, C, or A, and irradiates light onto patches formed on the print medium B. The light-receiving element 13 receives light irradiated from the light-emitting element 12 and reflected off the patches. The color measuring unit 11 measures the color of each patch based on the light received by the light-receiving element 13 and outputs the colorimetric value to the control unit 30. The colorimetric value is represented by a color value, and specifically color coordinates in a device-independent color space such as Lab values in the L*a*b* color space or XYZ values in the XYZ color space.

The moving unit 20 has a base 21 and an arm 22, for example. The base 21 is disposed at a prescribed position in the colorimetry system 10. A white point 23, for example, is provided on the base 21 for calibrating the color measuring unit 11. The white point 23 is disposed at a prescribed position on the base 21 and has a predetermined color value. This color value is represented by color coordinates in a device-independent color space, such as Lab values.

The arm 22 is configured of a plurality of links. In this example, the arm 22 has a first link 24 and a second link 25. The proximal end of the first link 24 is connected to the base 21 by a first rotary joint 26, for example. The first rotary joint 26 has a first rotary actuator 26*a*, such as a motor, which rotates the arm 22 relative to the base 21 about a central axis aligned in the up-down direction. The proximal end of the second link 25 is connected to the distal end of the first link 24 by a second rotary joint 27. The second rotary joint 27 has a second rotary actuator 27*a*, such as a motor, which rotates the second link 25 relative to the first link 24 about a central axis aligned in the up-down direction. Additionally, the distal end of the second link 25 is connected to the color measuring unit 11 by a prismatic joint 28, for example. The prismatic joint 28 has a linear actuator 28*a*, such as a motor or solenoid, which moves the color measuring unit 11 up and down relative to the second link 25. With this configuration, the arm 22 can move the color measuring unit 11 in left-right, front-rear, and up-down directions.

As illustrated in FIG. 2, the colorimetry system 10 is also provided with a display unit 14 and an input unit 15. The display unit 14 is a display, for example, that is electrically connected to the control unit 30. Under the control of the control unit 30, the display unit 14 displays a target image G (see FIG. 6A), which is an image to be printed on a print medium B; a position input button H (see FIG. 6B); an image of a pointer controlled by the input unit 15, and the like. The input unit 15 is configured of a mouse and a touchscreen, for example, and is electrically connected to the control unit 30. When operated by the user, the input unit 15 inputs the position of the pointer on the display unit 14 into the control unit 30.

<Control Unit>

The control unit 30 is a computer, for example. As illustrated in FIG. 2, the control unit 30 is provided with an interface 31, an arithmetic unit 32, and a storage unit 33. The control unit 30 may be configured as a standalone device, or a plurality of devices in a distributed arrangement. In the latter case, the devices interact with each other to implement the operation of the colorimetry system 10.

The interface 31 is electrically connected to an external device D and receives image data and other various data from the external device D. The external device D may be a computer, a camera, a communication network, a storage medium, a display, or a printer, for example. The image data is raster data and the like representing the target image G, which is the image to be printed on a print medium B. The image data is represented using color coordinates in a device-dependent color space, such as RGB values in the RGB color space.

The storage unit 33 is a memory that the arithmetic unit 32 can access. The storage unit 33 has a RAM and a ROM. The RAM temporarily stores various data, including data received by the interface 31 and data converted by the arithmetic unit 32. The ROM stores programs, prescribed data, and the like for performing various data processes. As an alternative to the storage unit 33, the programs may be stored in an external storage medium, such as a CD-ROM, that is accessible by the arithmetic unit 32.

The arithmetic unit 32 includes a CPU or other processor and may include an ASIC or other circuitry. By executing programs stored in the storage unit 33, the arithmetic unit 32 controls the components of the colorimetry system 10 to implement color measuring operations and other various operations.

The control unit 30 is connected to the first rotary actuator 26*a*, second rotary actuator 27*a*, and linear actuator 28*a* of the moving unit 20 through a movement drive circuit 34 and is connected to movement sensors 29, such as encoders that detect the amount of rotation, the rotated angle, or the amount of movement of corresponding actuators. The control unit 30 controls the drive of each actuator on the basis of the detection results from the movement sensors 29. With this configuration, the control unit 30 controls movement of the color measuring unit 11 by controlling the first rotary actuator 26*a*, second rotary actuator 27*a*, and linear actuator 28*a* of the arm 22 (see FIG. 1) based on detection results from the movement sensors 29.

<Patch Chart>

As illustrated in the example of FIG. 1, the patch chart C includes a plurality of patches. Among these patches are first patches C1 for predetermined first colors, and second patches C2 for predetermined second colors. The patches are rectangular color chips, for example, of a size that the color measuring unit 11 can measure. The size of the patches may be predetermined on the basis of the resolution of the color measuring unit 11. Alternatively, the size of the patches may be determined on the basis of the number of patches in the patch chart C and the size of the printing area available for printing the patch chart C. The first patches C1 and second patches C2 may be the same size, for example.

The first colors of the plurality of first patches C1 in the patch chart C have different color values from each other. Similarly, the second colors of the plurality of second patches C2 in the patch chart C have different color values from each other. As will be described in more detail later, the first colors are colors in a color gamut printable by a device used for printing a target image G (FIG. 6A), and the second colors are colors designated by the user on the target image G, for example. The first and second colors are represented by color coordinates in a device-dependent color space, such as RGB values in an RGB color space.

The patch chart C has a rectangular shape with four corners, for example. The plurality of patches in the patch chart C are arranged in the front-rear direction and the left-right direction to form a grid pattern. The patches configure columns aligned in the front-rear direction and rows aligned in the left-right direction. In the example of FIG. 1, the patches in the patch chart C have a first column e1 through a twenty-third column e23 juxtaposed in order from left to right, and a first row f1 through a thirty-sixth row f36 juxtaposed in order from rear to front.

<Patch Information>

Patch information is information on each of the plurality of patches in the patch chart C related to their position (patch position) in the patch chart C and their type (patch type), i.e., whether they are a first patch C1 or a second patch C2. The patch information may be stored in the storage unit 33 in advance. Alternatively, the control unit 30 may acquire the patch information from the external device D or the input unit 15. Alternatively, the control unit 30 may acquire the patch information from the external device D or the input unit 15 and store the patch information in the storage unit 33. The sample patch information in FIG. 3 associates the patch type, patch position, and color value for each patch.

When the patches in the patch chart C are arranged in a grid pattern with patches aligned in the front-rear direction and left-right direction, the patch positions of the patches in the patch chart C are defined by columns and rows. In this case, columns define the position of a patch in the patch chart C relative to the left-right direction, while rows define the position of a patch in the patch chart C relative to the front-rear direction. In the example of FIG. 3, the first patch C1 labeled No. 1 and the first patch C1 labeled No. 2 are aligned in the same first column e1 and thus have the same left-right position. The first patch C1 labeled No. 1 and the second patch C2 labeled number No. 730 are aligned in the same first row f1 and thus have the same front-rear position.

<Color Measuring Operations on the Colorimetry System>

Figure 4:
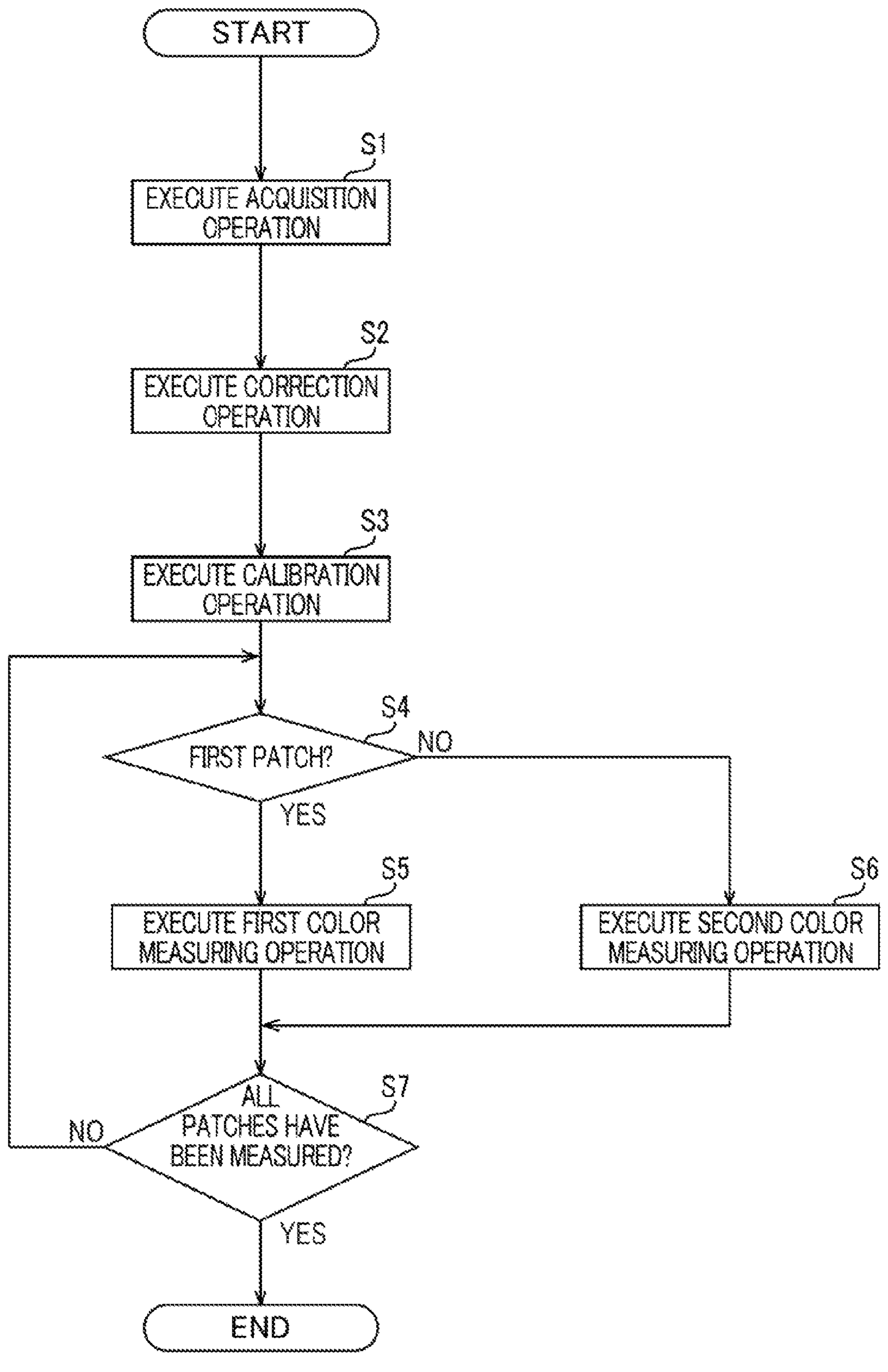
FIG. 4 is a flowchart illustrating steps in an example of color measuring operations performed on the colorimetry system for printed matter illustrated in FIG. 1.

FIG. 4 is a flowchart illustrating an example of color measuring operations performed on the colorimetry system 10 according to the first embodiment. The control unit 30 executes the color measuring operations for measuring colors in printed matter A on the basis of this flowchart. When an instruction to perform color measuring operations is received from the user through the input unit 15, for example, the control unit 30 executes the operations on the basis of this flowchart. In S1 at the beginning of FIG. 4, the control unit 30 executes operations to acquire patch information from the storage unit 33 or the like (acquisition operation). The control unit 30 acquires the patch type, patch position, and color value for each patch from this patch information.

In S2 the control unit 30 executes an operation to correct the acquired patch positions for aligning the position of the color measuring unit 11 moved by the moving unit 20 with the position of each patch in the patch chart C (correction operation). For example, the control unit displays an image of the position input button H on the display unit 14 for inputting the position of the patch chart C. The user controls the arm 22 to move the color measuring unit 11 to a corner of the patch chart C and operates the position input button H using the input unit 15 to input the corner position in the display unit 14. As a result, the control unit 30 acquires the position of the color measuring unit 11 as a corner position of the patch chart C on the basis of the movement amount of the arm 22. As the user repeatedly moves the color measuring unit 11 and operates the input unit 15 in this way, the control unit 30 acquires the positions of at least three corners of the patch chart C. The control unit 30 then acquires the position of the patch chart C relative to the moving unit 20 based on these corner positions of the patch chart C. Next, the control unit 30 corrects the patch positions acquired in S1 on the basis of the acquired position of the patch chart C relative to the moving unit 20, so that the corrected patch position for each patch matches the position of the corresponding patch in the patch chart C relative to the moving unit 20.

In S3 the control unit 30 calibrates the color measuring unit 11 (calibration operation). For this calibration, the control unit 30 acquires color measurement conditions from the color measuring unit 11, external device D, input unit 15, or the like. The color measurement conditions include the type of the light-emitting element 12 in the color measuring unit 11 and the viewing angle of the observer, i.e., the user, for example. Next, the control unit moves the color measuring unit 11 using the arm 22, measures the white point 23 with the color measuring unit 11, and acquires a colorimetric value of the white point 23. The control unit 30 then acquires a predetermined color value of the white point 23 from the storage unit 33 and performs color adjustments for the color measuring unit 11 based on the predetermined color value and colorimetric value of the white point 23 and the color measurement conditions.

Next, the control unit 30 acquires colorimetric values of patches on the basis of the patch types acquired in S1, the patch positions corrected in S2, and the color measuring unit 11 calibrated in S3. In the present embodiment, the color measuring operation is performed for each patch. In other words, the process from S4 to S7 of FIG. 4 is performed for all patches in the patch chart C on a patch-by-patch basis. In a case of the patch chart C illustrated in FIG. 1, for example, the process is performed in order from the patch labeled number No. 1 to the patch labeled number No. 780 in the patch information in FIG. 3.

In S4 the control unit 30 executes an operation to determine whether one patch is a first patch C1 or a second patch C2 on the basis of the patch information (determination operation).

When the patch type of the patch subjected to the color measurement is a first patch C1 (S4: YES), in S5 the control unit 30 executes a first color measuring operation for controlling the color measuring unit 11 to measure the color of the first patch C1 while moving the color measuring unit 11 on the basis of the patch information which includes information specifying the patch position. In the first color measuring operation, the control unit 30 controls the arm 22 to bring the color measuring unit 11 into contact with the print medium B. Next, the control unit 30 controls the arm 22 to move the color measuring unit 11 toward the first patch C1 subjected to the color measurement so that the color measuring unit 11 moves horizontally while in contact with the print medium B. The control unit 30 measures the color of the first patch C1 subjected to the color measurement without halting the movement of the color measuring unit 11 above the first patch C1. In this way, the control unit 30 measures the color of the first patch C1 and stores the colorimetric value of the first patch C1 in the patch information stored in the storage unit 33 in association with the patch position of the first patch C1. The control unit 30 subsequently moves the color measuring unit 11 horizontally to a predetermined position or to the next patch to be subjected to the color measurement.

On the other hand, when the control unit 30 determines in S4 that the patch subjected to the color measurement is a second patch C2 (S4: NO), in S6 the control unit 30 executes a second color measuring operation for controlling the color measuring unit 11 to measure the second patch C2 while halting the movement of the color measuring unit 11, i.e., while the color measuring unit 11 is stationary. In this second color measuring operation, the control unit 30 controls the arm 22 to move the color measuring unit 11 upward so as to be spaced apart from the print medium B. Next, the control unit 30 controls the arm 22 to move the color measuring unit 11 horizontally, i.e., parallel to the patch chart C, toward the above the second patch C2 subjected to the color measurement while the color measuring unit 11 remains spaced apart from the print medium B. The control unit 30 stops the color measuring unit 11 above the second patch C2 subjected to the color measurement, and then controls the arm 22 to move the color measuring unit 11 downward into contact with the print medium B while halting the horizontal movement of the color measuring unit 11. Thereafter, the control unit 30 measures the color of the second patch C2 subjected to the color measurement with the color measuring unit 11 and stores the colorimetric value of the second patch C2 in the patch information stored in the storage unit 33 in association with the patch position of the second patch C2. The control unit subsequently moves the color measuring unit 11 upward again and, while the color measuring unit 11 is spaced apart from the print medium B, moves the color measuring unit 11 horizontally to a predetermined position or to the next patch to be subjected to the color measurement.

In S7 the control unit 30 executes an operation to determine whether all patches have been measured on the basis of the patch information. If there remain any patches to be measured (S7: NO), the control unit 30 returns to the process of S4 and repeats the process from S4 to S7. Once all patches in the patch chart C have been measured (S7: YES), the control unit ends the color measuring operations.

Thus, the control unit 30 can measure the colors of first patches C1 rapidly in the first color measuring operation by not halting the movement of the color measuring unit 11, i.e., by not stopping the color measuring unit 11 during measurements. In the second color measuring operation, the control unit 30 can measure the color of a second patch C2 at a predetermined position, such as the center of the second patch C2, by halting the movement of the color measuring unit 11, i.e., by stopping the color measuring unit 11 during the measurement. That is, although the edges of a patch can be irregular in color because they are adjacent to other patches, the center of the patch is farther away from the other patches than the edges, so that there is little chance of any color irregularities therein. In the second color measuring position, the color of the second patch C2 can be measured accurately since the measurement is performed at a predetermined position, such as the center of the second patch C2. Hence, the above operations achieve an optimal balance between time and accuracy in measuring patches on the basis of the patch types of the patches.

In the patch chart C illustrated in FIG. 1, only patches of the same type are arranged in one column, but the first patches C1 and second patches C2 may be mixed in the same columns.

In the colorimetry system 10 according to a first variation of the first embodiment, the patches described in the first embodiment are configured in a plurality of patch sets having patches aligned in a first direction. The patch sets are juxtaposed in a second direction that crosses the first direction and have first patch sets configured of first patches C1 and second patch sets configured of second patches C2. In the determination operation, the control unit 30 determines for each of the plurality of patch sets whether a patch set subjected to the color measurement is a first patch set or a second patch set on the basis of the patch information. When the control unit 30 determines that a patch set subjected to the color measurement is a first patch set, in the first color measuring operation the control unit 30 controls the color measuring unit 11 to measure the colors of the plurality of the first patches C1 while the moving unit 20 moves the color measuring unit 11 along the first patch set. When the control unit 30 determines that a patch set subjected to the color measurement is a second patch set, in the second color measuring operation the control unit 30 controls the color measuring unit 11 to measure the colors of the second patches C2 while the moving unit 20 repeatedly moves and halts the color measuring unit 11 along the second patch set.

Specifically, the patch chart C is configured of a plurality of patches aligned in the front-rear direction and the left-right direction to configure a grid pattern, as illustrated in the example of FIG. 1. The plurality of patches has columns aligned in the front-rear direction and rows aligned in the left-right direction. When the first direction is the front-rear direction, for example, the patch sets are columns having a plurality of patches aligned in the front-rear direction. Of these patch sets, the first patch sets are columns of first patches C1 having a plurality of first patches C1 aligned in the front-rear direction and including no second patches C2. The second patch sets are columns of second patches C2 having a plurality of second patches C2 aligned in the front-rear direction and including no first patches C1.

In the example of FIG. 1, the first column e1 through twenty-third column e23 of patches in the patch chart C are juxtaposed in order from left to right, with a maximum number of 36 patches in each column. In this example, 729 first patches C1 form 21 columns and 36 rows, with 36 first patches C1 aligned in the front-rear direction in each of the first column e1 through twentieth column e20 and 9 first patches C1 aligned in the front-rear direction in the twenty-first column e21. A blank area C0 having no first patches C1 or second patches C2 is formed on the front side of the twenty-first column e21. This blank area C0 is positioned between the twentieth column e20 of first patches C1 and the twenty-second column e22 of second patches C2 in the left-right direction.

The patch chart C also has 50 second patches C2 that form 2 columns and 36 rows, with 36 second patches C2 aligned in the front-rear direction in the twenty-second column e22 and 14 second patches C2 aligned in the front-rear direction in the twenty-third column e23. Thus, each of the first column e1 through twenty-first column e21 of first patches C1 and each of the twenty-second column e22 and twenty-third column e23 of second patches C2 are arranged at different positions from each other in the left-right direction.

Figure 5:
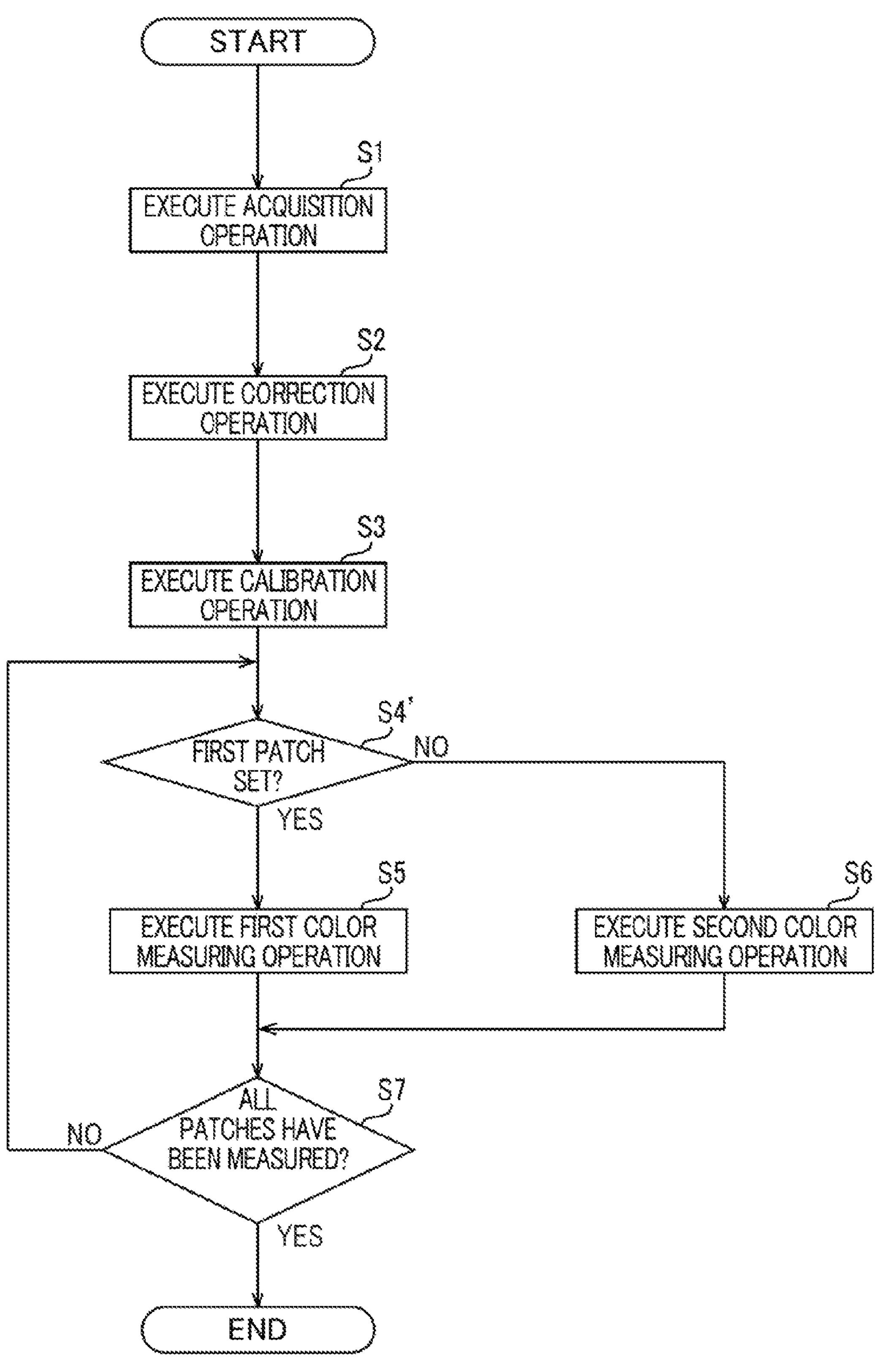
FIG. 5 is a flowchart illustrating steps in another example of color measuring operations performed on the colorimetry system for printed matter illustrated in FIG. 1.

FIG. 5 is a flowchart illustrating an example of color measuring operations performed on the colorimetry system 10 according to the first variation. The control unit 30 executes the color measuring operations on the basis of this flowchart. The flowchart in FIG. 5 differs from the flowchart in FIG. 4 in that step S4' is executed in place of step S4.

Specifically, the control unit 30 executes the acquisition operation, the correction operation, and the calibration operation in steps S1 through S3. Next, in S4' the control unit 30 determines in the determination operation whether each of the patch sets is a first patch set or a second patch set on the basis of the patch information. In this determination operation, the control unit 30 acquires, as a patch set, a column of patches (hereinafter referred to as "patch column") in the patch chart C on the basis of the patch positions of the patches in the patch information acquired in the acquisition operation of S1. Next, the control unit 30 determines for each patch column whether the patch column subjected to the color measurements is a first patch set or a second patch set on the basis of the patch types of the patches in the patch information. In other words, the control unit 30 determines that a patch column including first patches C1 and no second patches C2 is a first patch set and a patch column including second patches C2 and no first patches C1 is a second patch set.

When the patch column subjected to the color measurements is determined to be a column of first patches C1, i.e., a first patch set in the determination operation (S4': YES), in S5 the control unit 30 executes the first color measuring operation. In this first color measuring operation, the control unit 30 controls the arm 22 to move the color measuring unit 11 downward until the color measuring unit 11 contacts the print medium B, for example. Next, when the control unit 30 is measuring the colors of the first patches C1 in the first column e1, i.e., when the first patches C1 in the first column e1 is determined to be a first patch set subjected to the color measurements in S4', the control unit 30 controls the arm 22 to move the color measuring unit 11 to a position above or rearward of the first patch C1 positioned in the first column e1 and first row f1. Subsequently, the control unit 30 moves the color measuring unit 11 forward along the first column e1 while the color measuring unit 11 remains in contact with the print medium B and measures the color with the color measuring unit 11 of each first patch C1 in the first column e1 from the first row f1 to the thirty-sixth row f36 without halting the movement of the color measuring unit 11. In this way, the control unit 30 measures the colors of the first patches C1 in the first column e1 from the first row f1 to the thirty-sixth row f36 and stores the colorimetric value of each first patch C1 in the patch information stored in the storage unit 33 in association with the patch position of the corresponding first patch C1. The control unit 30 subsequently moves the color measuring unit 11 to a predetermined position or to the next patch column to be subjected to the color measurements.

On the other hand, when the patch column subjected to the color measurements is determined to be a column of second patches C2, i.e., a second patch set in the determination operation (S4': NO), in S6 the control unit 30 executes the second color measuring operation. In this second color measuring operation, when measuring second patches C2 in the twenty-second column e22, i.e., when the second patches C2 in the twenty-second column e22 is determined to be a second patch set subjected to the color measurements in S4', for example, the control unit 30 controls the arm 22 to move the color measuring unit 11 to a position above or rearward of the second patch C2 positioned in the twenty-second column e22 and first row f1. Next, the control unit 30 controls the arm 22 to move the color measuring unit 11 upward so as to be spaced apart from the print medium B. The control unit 30 then controls the arm 22 to move the color measuring unit 11 forward along the twenty-second column e22 while the color measuring unit 11 remains spaced apart from the print medium B. Subsequently, the control unit 30 controls the arm 22 to move the color measuring unit 11 downward until the color measuring unit 11 contacts the print medium B at a predetermined position in the second patch C2 of the first row f1, such as the center of the second patch C2. Next, the control unit 30 measures the color of the second patch C2 with the color measuring unit 11 while halting the movement of the color measuring unit 11, i.e., while the color measuring unit 11 is stationary.

Thus, for each second patch C2 in the twenty-second column e22 from the first row f1 to the thirty-sixth row f36, the control unit 30 repeatedly moves the color measuring unit 11 upward, moves the color measuring unit 11 forward along the twenty-second column e22 while the color measuring unit 11 is spaced apart from the print medium B, halts the movement of the color measuring unit 11 at a position above the center of the second patch C2, bring the color measuring unit 211 toward the print medium B, and measures the color of the second patch C2 while the color measuring unit 11 is in contact with the print medium B. In this way, the control unit 30 measures the color of each second patch C2 in the twenty-second column e22 from the first row f1 to the thirty-sixth row f36 and stores the colorimetric value of each second patch C2 in the patch information stored in the storage unit 33 in association with the patch position of that second patch C2. Subsequently, the control unit 30 moves the color measuring unit 11 to a predetermined position or to the next patch column to be subjected to the color measurements.

When there remain any patches to be measured (S7: NO), the control unit 30 returns to the process of S4' and repeats the process from S4' to S7. In the example of FIG. 1, the control unit 30 executes the first color measuring operation in S5 on patches in each of the first column e1 through twenty-first column e21. Among these first column e1 through twenty-first column e21, the control unit 30 performs color measurements with the color measuring unit 11 for first patches C1 of the first row f1 through thirty-sixth row f36 in each of the first column e1 through twentieth column e20. With respect to the twenty-first column e21, the control unit 30 performs color measurements with the color measuring unit 11 for the first patches C1 in the first row f1 through ninth row f9. Furthermore, the control unit 30 executes the second color measuring operation of S6 on patches in each of the twenty-second column e22 and twenty-third column e23. With respect to the twenty-second column e22, the control unit 30 performs color measurements with the color measuring unit 11 for the second patches C2 in the first row f1 through thirty-sixth row f36. With respect to the twenty-third column e23, the control unit 30 performs color measurements with the color measuring unit 11 for second patches C2 in the first row f1 through fourteenth row f14.

Once all patches in the patch chart C have been measured (S7: YES), the control unit 30 ends the color measuring operations. Thus, the control unit 30 can rapidly measure the colors of first patches C1 in patch columns of the first patches C1 in the first color measuring operation by not halting the movement of the color measuring unit 11 while measuring the colors of the first patches C1 in each patch column of the first patches C1. Conversely, the control unit 30 can accurately measure the colors of second patches C2 in patch columns of the second patches C2 in the second color measuring operation by halting the movement of the color measuring unit 11 at each second patch C2 while measuring the colors of the second patches C2 in each patch column of the second patches C2. Hence, the above operations can achieve an optimal balance between time and accuracy in measuring the colors of patches on the basis of the types of patch columns.

Furthermore, the patch columns of first patches C1 and the patch columns of second patches C2 are arranged in the patch chart C at different positions from each other in the left-right direction. As a result, by moving the color measuring unit 11 along a patch column of first patches C1 in the front-rear direction, the control unit 30 can execute the first color measuring operation on all first patches C1 in the patch column. Furthermore, by moving the color measuring unit 11 along a patch column of second patches C2 in the front-rear direction, the control unit 30 can execute the second color measuring operation on all second patches C2 in the patch column. Thus, since first patches C1 and second patches C2 are not mixed in the same columns but configure different columns from each other, the first color measuring operation or second color measuring operation can be performed uniformly on individual patch columns.

Figure 7:
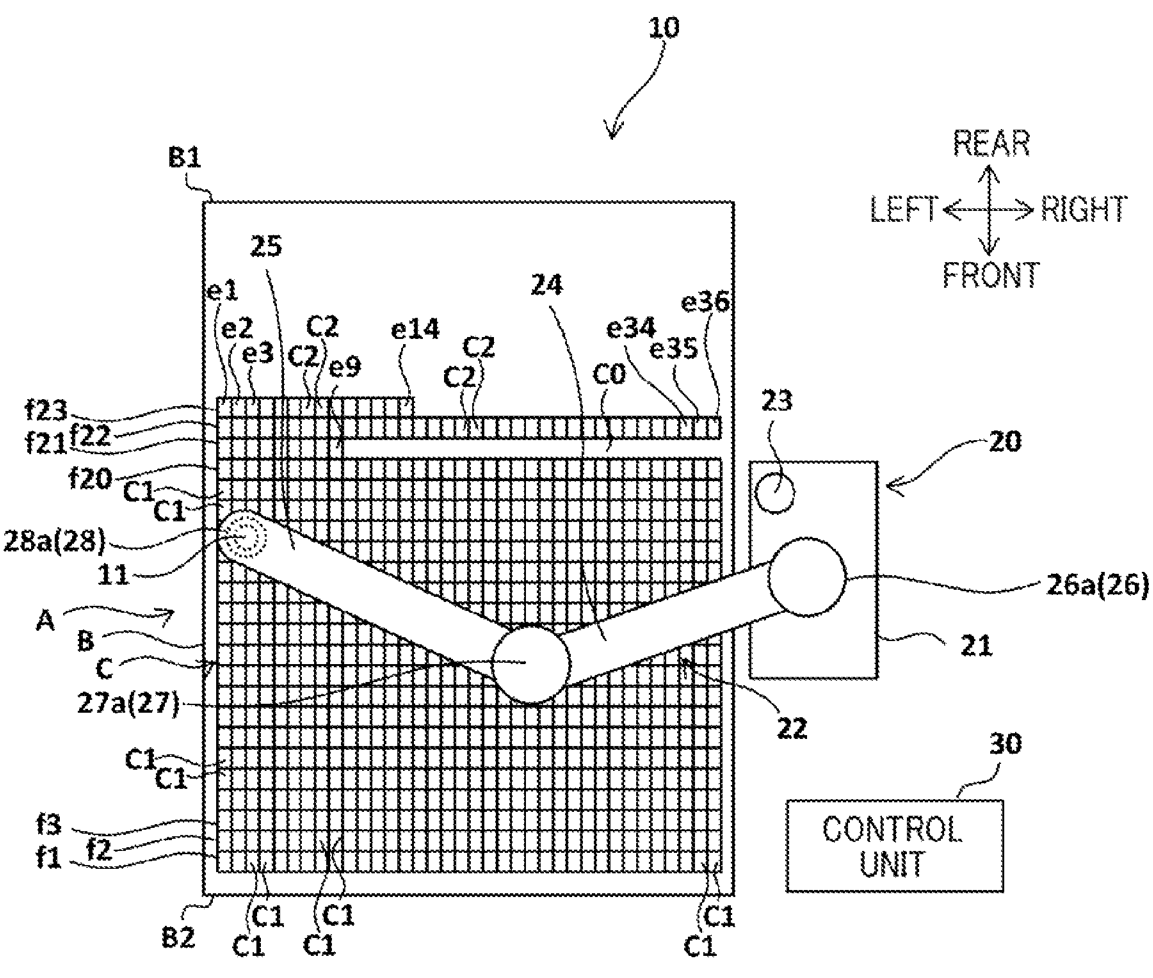
FIG. 7 is a schematic plan view of another example of a colorimetry system for printed matter.

Although the plurality of patches in a patch set are aligned in the front-rear direction in the example of FIG. 1, the direction in which patches are aligned in a patch set is not limited to this example. For example, when the first direction is the left-right direction, as illustrated in FIG. 7, patch sets are rows having a plurality of patches aligned in the left-right direction. The patch rows include first patch sets and second patch sets. The first patch sets are rows having first patches C1 aligned in the left-right direction and including no second patches C2, while the second patch sets are rows having second patches C2 aligned in the left-right direction and including no first patches C1.

In the example of FIG. 7, the first row f1 through twenty-third row f23 of patches in the patch chart C are juxtaposed in order from front to rear, while the first column e1 through thirty-sixth column e36 of patches are juxtaposed in order from left to right. Each of the first row f1 through twenty-first row f21 constitutes a first patch set which is a row of first patches C1 aligned in the left-right direction. Each of the twenty-second row f22 and twenty-third row f23 constitutes a second patch set which is a row of second patches C2 aligned in the left-right direction. The twenty-first row f21 has 9 first patches juxtaposed in the left-right direction, and a blank area C0 having no first patches C1 or second patches C2 is formed to the right of the twenty-first row f21. The blank area C0 is positioned between the twentieth row f20 of first patches C1 and the twenty-second row f22 of second patches C2 in the front-rear direction.

When performing color measuring operations with the colorimetry system 10 in this case, in the first color measuring operation the control unit 30 controls the color measuring unit 11 to measure the color of each first patch C1 in a row of first patches C1 while moving the color measuring unit 11 rightward along the row of first patches C1. In the second color measuring operation, the control unit 30 controls the color measuring unit 11 to measure the color of each second patch C2 in a row of second patches C2 while halting movement of the color measuring unit 11 by repeatedly moving and halting the color measuring unit 11 along the row of second patches C2. In this way, the above operations can achieve an optimal balance between time and accuracy in measuring the colors of patches on the basis of the types of the patch sets. Furthermore, by arranging the rows of first patches C1 and the rows of second patches C2 at different positions in the patch chart C relative to the front-rear direction, the first color measuring operation or second color measuring operation can be performed uniformly for individual rows.

Figure 8:
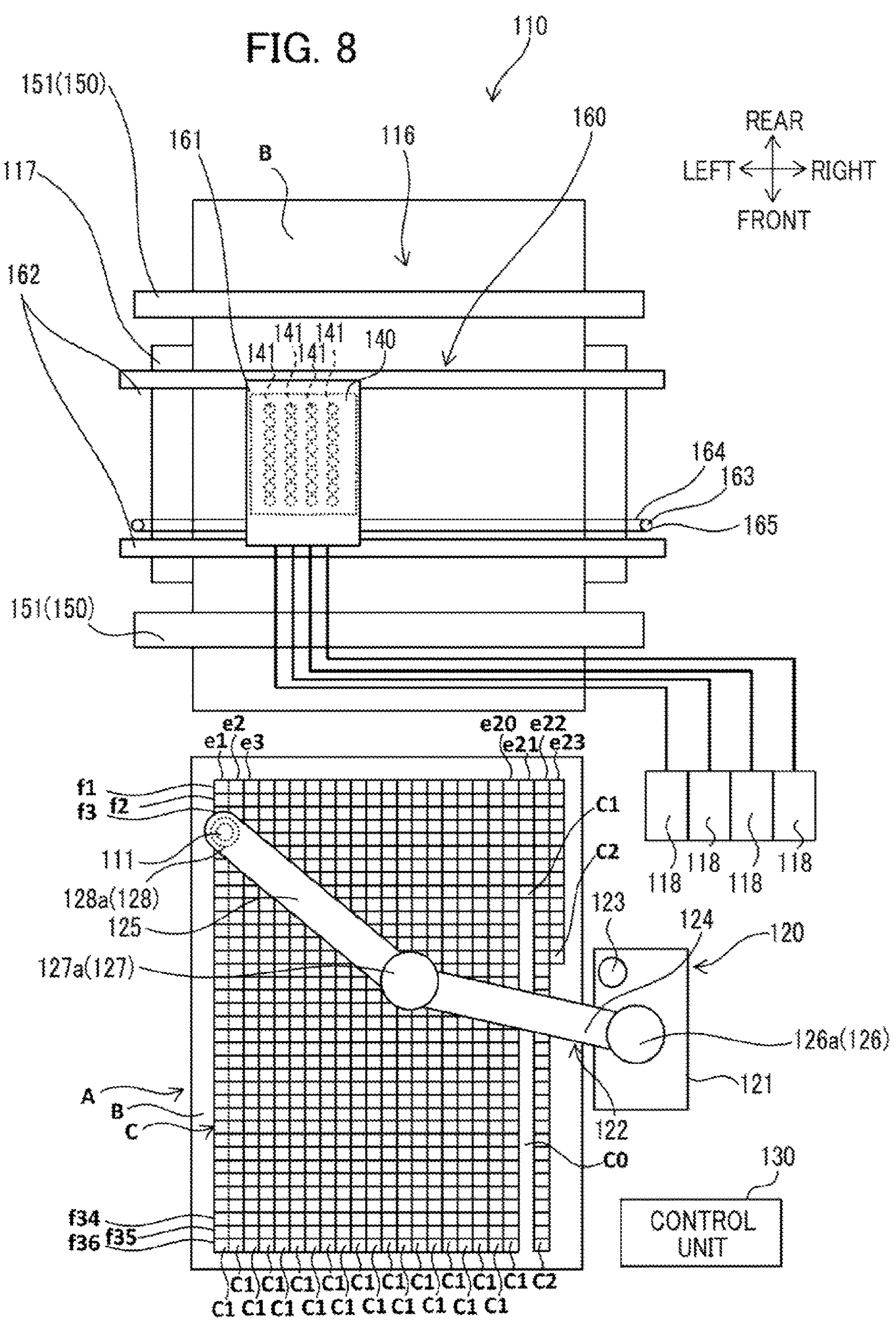
FIG. 8 is a schematic plan view of still another example of a colorimetry system for printed matter.

The colorimetry system 110 according to a second variation of the first embodiment is further provided with a printing unit 116 for printing patches on the print medium B, as illustrated in the example of FIG. 8. The control unit 130 executes a printing operation for printing the patch chart C on the print medium B. In the present variation, first colors are colors in the color gamut printable by the printing unit 116, for example.

Figure 9:
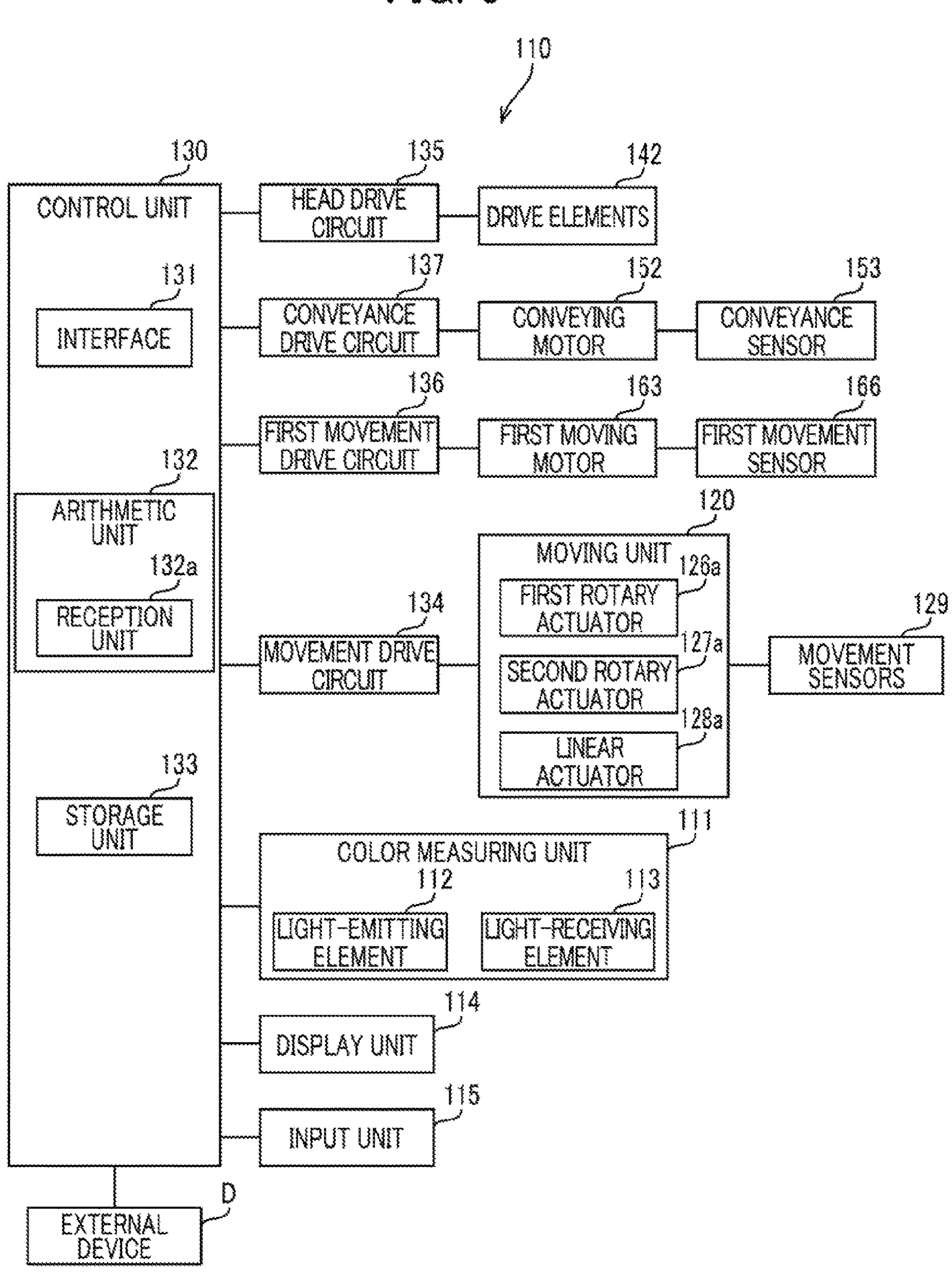
FIG. 9 is a block diagram illustrating the functional structure of the colorimetry system for printed matter illustrated in FIG. 8.

As illustrated in FIG. 9, in addition to the storage unit 133 that stores the patch information, the colorimetry system 110 in the present variation is provided with a reception unit 132*a* that receives designation of the second colors by the user as described later. The patch information also includes information on the patch positions and patch types of second patches C2 corresponding to the second colors received by the reception unit 132*a*.

Specifically, the printing unit 116 of the present variation employs a serial head system that is provided with a head 140, a platen 117, a plurality of tanks 118, a conveying unit 150, and a head moving unit 160. As illustrated in FIG. 9, the printing unit 116 is arranged to the rear of the color measuring unit 111 in the present variation. As an alternative, the printing unit 116 may be configured of a line head system. In this case, the printing unit 116 is not provided with the head moving unit 160, and the head 140 is immovable but has a length in the left-right direction greater than the left-right dimension of the printing area on the print medium B.

Here, the direction in which the conveying unit 150 conveys the print medium B will be called the front-rear direction. A direction crossing (e.g., orthogonal to) the front-rear direction in which the head moving unit 160 moves the head 140 will be called the left-right direction. A direction crossing (e.g., orthogonal to) the front-rear direction and left-right direction will be called the up-down direction. However, the arrangement of the printing unit 116 is not limited to these directions.

The head 140 has a plurality of nozzles 141, and a plurality of drive elements 142 (see FIG. 9). The nozzles 141 are open in the bottom surface of the head 140. The drive elements 142 may be piezoelectric elements, heating elements, electrostatic actuators, and the like. One drive element 142 is provided for each nozzle 141 and applies pressure to eject ink from the nozzle 141. The platen 117 has a flat top surface. The platen 117 defines the distance between the print medium B placed on the top surface of the platen 117 and the bottom surface of the head 140 disposed in opposition to this top surface. The tanks 118 store ink in the respective colors cyan (C), magenta (M), yellow (Y), and black (K) and supply their ink to corresponding nozzles 141 in the head 140.

The conveying unit 150 has two conveying rollers 151 and a conveying motor 152 (see FIG. 9), for example. The conveying rollers 151 are disposed on either side of the platen 117 in the front-rear direction. Each conveying roller 151 has a shaft oriented in the left-right direction and is coupled to the conveying motor 152. The conveying rollers 151 rotate about their shafts through the drive of the conveying motor 152 to convey the print medium B over the platen 117 in the front-rear direction.

The head moving unit 160 has a first carriage 161, two first guide rails 162, a first moving motor 163, and a first endless belt 164. The two first guide rails 162 extend in the left-right direction over the platen 117 so that the head 140 is interposed between the first guide rails 162 in the front-rear direction. The first carriage 161 supports the head 140. The first carriage 161 is supported on the two first guide rails 162 to be movable in the left-right direction. The first endless belt 164 extends in the left-right direction and is attached to the first carriage 161. The first endless belt 164 is also attached to the first moving motor 163 via a first pulley 165. When the first moving motor 163 is driven, the first endless belt 164 circulates and the first carriage 61 reciprocates in the left-right direction along the first guide rails 62. In this way, the first carriage 161 moves the head 140 in the left and right directions.

As illustrated in FIG. 9, the control unit 130 is also connected to the drive elements 142 via a head drive circuit 135 and controls the driving of the drive elements 142. Thus, the control unit 130 controls the timing and quantity of ink ejected from the head 140 by the drive elements 142.

Furthermore, the control unit 130 is connected to the first moving motor 163 of the head moving unit 160 via a first movement drive circuit 136 and is connected to a first movement sensor 166, such as an encoder, for detecting the position of the first carriage 161. The control unit 130 controls the drive of the first moving motor 163 on the basis of detection results from the first movement sensor 166. In this way, the control unit 130 controls movement of the first carriage 161 and head 140 by the head moving unit 160.

The control unit 130 is also connected to the conveying motor 152 of the conveying unit 150 via a conveyance drive circuit 137 and is connected to a conveyance sensor 153, such as encoder, for detecting the rotation amount or rotation angle of the conveying motor 152. The control unit 130 controls the drive of the conveying unit 150 on the basis of detection results from the conveyance sensor 153, whereby the control unit 130 can control the conveyance of the print medium B by the conveying unit 150.

With the printing unit 116 having this configuration, the control unit 130 acquires image data for images such as the target image G (FIG. 6A) and patch chart C from the external device D, storage unit 133, and the like and executes printing operations based on this image data. For example, the control unit 130 causes the head 140 to eject ink onto the print medium B while moving the head 140 rightward or leftward. Next, the control unit 130 causes the print medium B to be conveyed forward. By repeatedly alternating between moving the head 40 while ejecting ink and conveying the print medium B, the printing unit 116 carries out printing operations to print an image on the print medium B with ink.

Figure 10:
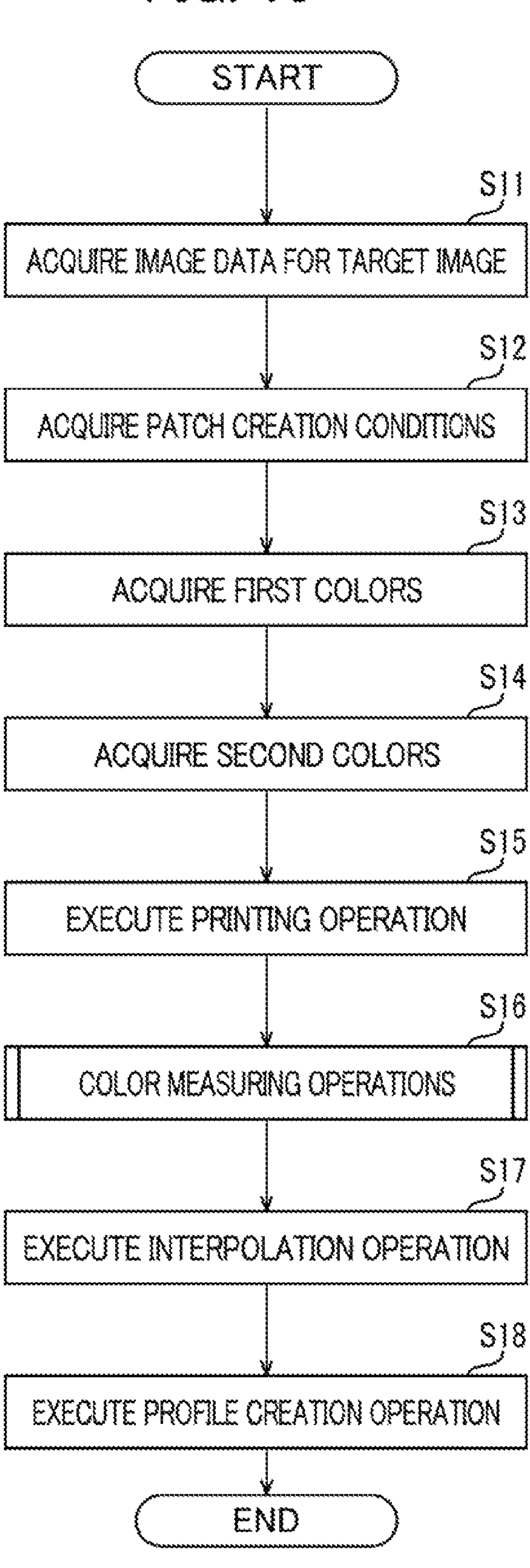
FIG. 10 is a flowchart illustrating steps in an example of a control method of the colorimetry system for printed matter illustrated in FIG. 8.

As a method of controlling the colorimetry system 110 to print an image on the print medium B, the control unit 130 executes a process on the basis of the flowchart illustrated in the sample control method of FIG. 10, for example. The control unit 130 executes steps in this flowchart upon receiving printing instructions from the user through the input unit 15. Specifically, in S11 of FIG. 10, the control unit 130 acquires image data for the target image G to be printed on the print medium B from the external device D. In S12 the control unit 130 acquires patch creation conditions from the external device D or input unit 115, for example. Patch creation conditions acquired from the external device D or input unit 115 may include the size or type of the print medium B on which patches are to be printed, the patch size, and image data for the target image G, for example.

In S13 the control unit 130 acquires the first colors of the first patches C1. Here, the control unit 130 acquires the color gamut of the printing unit 116 from the storage unit 133 or the like. The color gamut of the printing unit 116 is the color range in which the printing unit 116 can print and is represented by device-dependent color coordinates, such as RGB values in the RGB color space. For example, the color gamut of the printing unit 116 has a color range from RGB values (0, 0, 0) to RGB values (255, 255, 255). Each of these RGB values represents a single color through a combination of a red color value, a green color value, and a blue color value, each of which has a possible 256 gradation.

The control unit 130 then acquires, as the first colors, some of color values in steps at prescribed gradation intervals from among a plurality of color values constituting the color gamut of the printing unit 116. For example, when color values are acquired from among a plurality of color values that constitutes a color gamut having 256 gradations for each of R, G, and B values at intervals of every 32 gradations, the first colors comprise $(256/32+1)^3=729$ colors. Thus, the first colors of the plurality of first patches C1 in the patch chart C have different color values from each other. The control unit 130 then sets the patch type for each patch having a first color to "first patch C1" and stores this patch type in the patch information stored in the storage unit 133 in association with the corresponding first color, as illustrated in the example of FIG. 3.

Figure 6A:
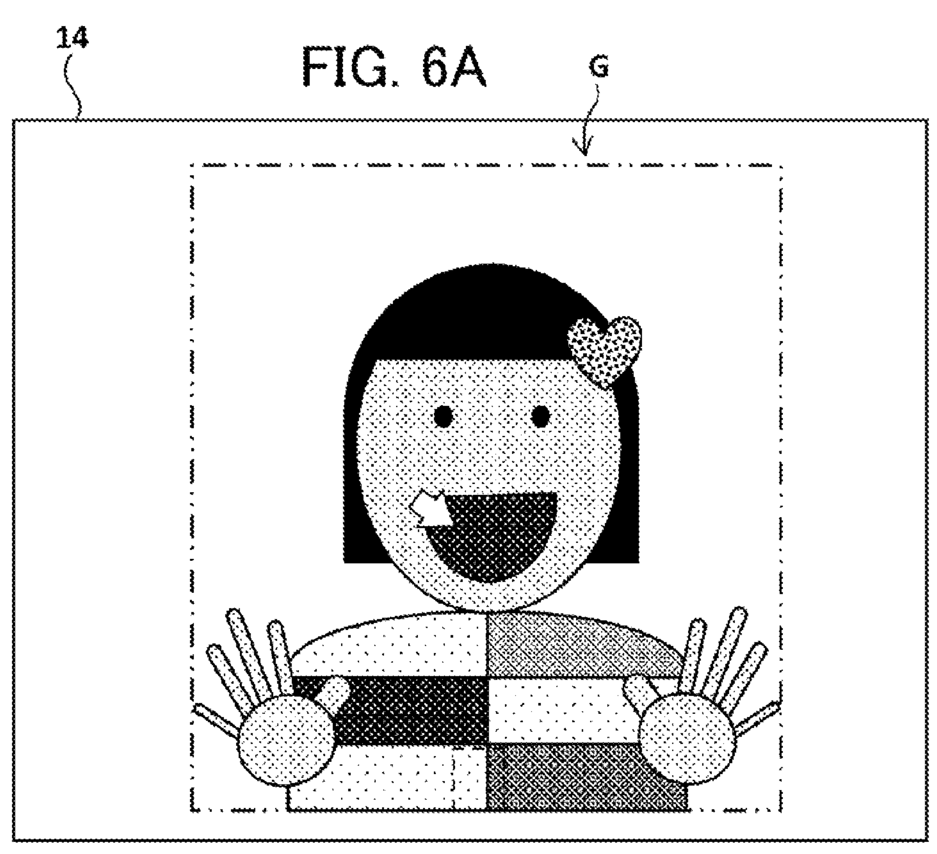
FIG. 6A is an explanatory diagram illustrating a display unit on which a target image and an image of a pointer controlled by an input unit are displayed.
Figure 6B:
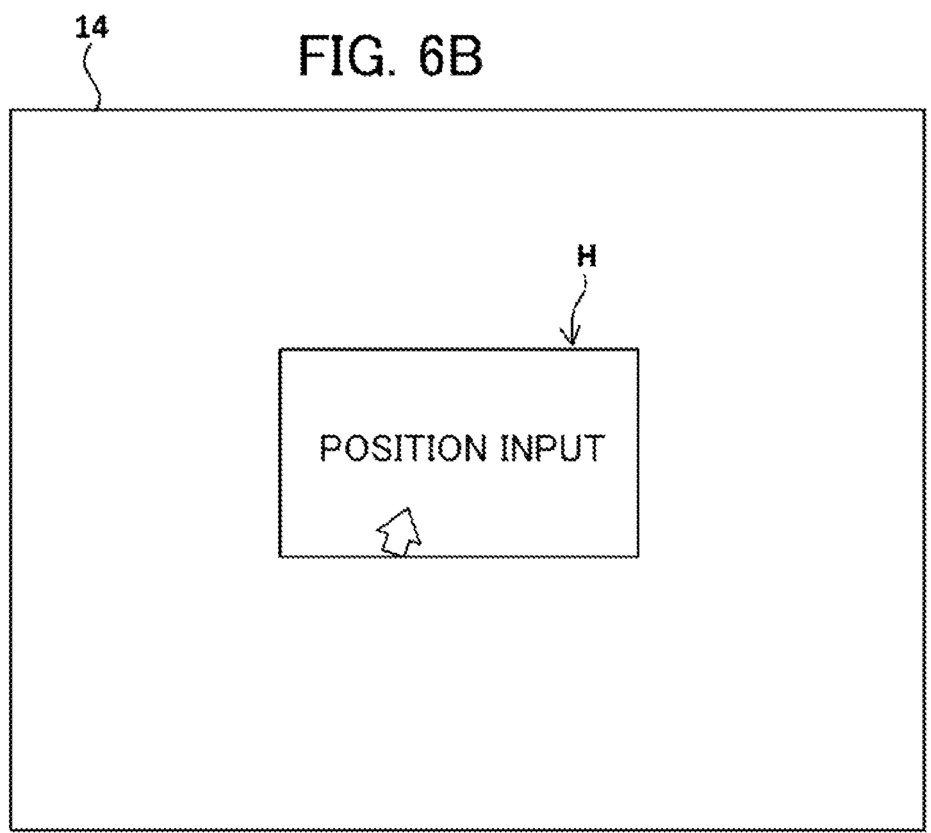
FIG. 6B is an explanatory diagram illustrating the display unit on which an image of a position input button for inputting a position of a patch chart is displayed.

In S14 the control unit 130 acquires the second colors of the second patches C2 from the reception unit 132*a*. Specifically, the control unit 130 displays the target image G to be printed on the print medium B on the display unit 114 on the basis of its image data, as illustrated in the example of FIG. 6A. The user operates the input unit 115 to designate a position in the target image G displayed on the display unit 114. On the basis of the image data for the target image G, the control unit 130 acquires the color in the target image G displayed on the display unit 114 at the position inputted by the input unit 115 and sets this color as a second color. Thus, the control unit 130 functions as the reception unit 132*a*.

Each time the user designates a position, the control unit 130 acquires a second color corresponding to the designated position. The color values of the second colors are represented by device-dependent color coordinates, such as RGB values. The control unit 130 then sets the patch type for each patch having a second color to "second patch C2" and stores this patch type in the patch information stored in the storage unit 133 in association with the corresponding second color, as in the example of FIG. 3.

In S15 the control unit 130 executes a printing operation. In the printing operation, the control unit 130 generates image data for the patch chart C based on the number of first colors, number of second colors, patch size, and size of the print medium B. Here, the control unit 130 arranges the plurality of patches in the patch chart C in a grid pattern having patches aligned in the front-rear direction and the left-right direction. In this way, the patch chart C forms columns that are first patch sets having a plurality of first patches C1 having first colors and aligned in the front-rear direction, and columns that are second patch sets having a plurality of second patches C2 having second colors and aligned in the front-rear direction. Next, the control unit 130 represents the patch position of each patch in the patch chart C by the column and row of that patch and stores this patch position in the patch information of the storage unit 133 in association with the color value for that patch.

Here, the first colors and second colors in the patch chart C are represented by RGB values, whereas the printing unit 116 prints using the four CMYK ink colors. In this case, the control unit 130 converts the RGB values in the image data for the patch chart C to CMYK values which are color coordinates in the CMYK color space, i.e., the color space dependent on the printing unit 116, on the basis of predetermined color conversion data stored in the storage unit 133. The control unit 130 then controls the printing unit 116 to print the patch chart C on the print medium B based on the converted image data. The printed matter A resulting from printing this patch chart C on the print medium B is conveyed forward by the printing unit 116 and supplied to the color measuring unit 111 disposed forward of the printing unit 116.

Next, the control unit 130 executes color measuring operations in S16. Here, the control unit 130 executes the color measuring operations described in steps S1 through S7 of FIG. 4 or FIG. 5. The first and second color measuring operations in this process can achieve a balance between time and accuracy of measuring the colors of the patches on the basis of the patch types of the patches. The control unit 130 acquires the colorimetric value for each patch through these color measuring operations and stores the colorimetric values in association with the color values of the patches in the patch information stored in the storage unit 133. Note that the correction operation of S2 can be omitted when the positions of patches relative to the moving unit 120 can be acquired on the basis of detection results from the conveyance sensor 153, first movement sensor 166, and movement sensors 129. In this case, the first and second color measuring operations can be executed on the basis of the positions of patches relative to the moving unit 120 based on the detection results of the sensors.

In S17 the control unit 130 executes an interpolation operation to interpolate first colors in the color gamut of the printing unit 116. In the interpolation operation, when the first colors are represented by RGB values at intervals of 32 gradations in the color gamut, the control unit 130 acquires RGB values for intervals smaller than this interval, such as intervals of 16 gradations, through linear interpolation based on the second colors. As a result, the control unit 130 acquires RGB values for $(256/16+1)^3=4{,}913$ colors. Next, the control unit 130 acquires Lab values corresponding to the RGB values of the 4,913 colors in the color gamut of the printing unit 116 through linear interpolation or the like based on the Lab values which are the colorimetric values of the first patches C1 and second patches C2 in the patch information and stores correspondence information in the storage unit 133 associating the RGB values and Lab values.

In S18 the control unit 130 executes a profile creating operation to create a color calibration profile. In the profile creating operation, the control unit 130 creates the color calibration profile on the basis of the correspondence information between RGB values in the color gamut of the printing unit 116 and Lab values, and predetermined color conversion data stored in the storage unit 133. For example, the control unit 130 converts Lab values in the color gamut to CMYK values on the basis of the predetermined color conversion data and creates a color calibration profile that associates the RGB values in the color gamut to CMYK values. Since this color calibration profile is based on the colorimetric values of the second colors designated by the user, the control unit 130 can bring colors in the printed target image G closer to the target Lab values by calibrating and printing the image data for the target image G on the basis of the color calibration profile.

Note that in steps S15 and S16 of FIG. 10, the control unit 130 may execute the first and second color measuring operations while executing the printing operation. For example, when the printing unit 116 is disposed to the rear of the color measuring unit 111, as in the example of FIG. 11, the printing unit 116 prints the patch chart C on the print medium B and then conveys the printed matter A forward. This patch chart C includes a plurality of rows as a plurality of patch sets. In the patch chart C, each patch set forms a row having a plurality of patches aligned in the left-right direction, and the first row f1 through twenty-third row f23 of patches are juxtaposed in order from front to rear.

In this case, the printing unit 116 prints the patch chart C on the print medium B in order from patches in the first row f1 and conveys the print medium B forward, thereby supplying the printed matter A to the color measuring unit 111 with the first row f1 on the leading edge. During the printing operation performed by the printing unit 116, the moving unit 120 moves the color measuring unit 111 rightward along each row of patches while sequentially measuring the color of each patch in the row with the color measuring unit 11 from left to right. Each time the printed matter A is conveyed forward, the color measuring unit 111 measures another row of patches sequentially to the rear of the first row f1. The printed matter A is conveyed forward once the color measuring unit 111 has completed the color measurements for each row. In other words, the printing unit 116 waits without printing more patches until the color measuring unit 111 has completed all color measurements in the current row. Thus, by executing the first and second color measuring operations while executing the printing operation, the control unit 130 can shorten the time between printing and measuring colors of the patch chart C.

Figure 11:
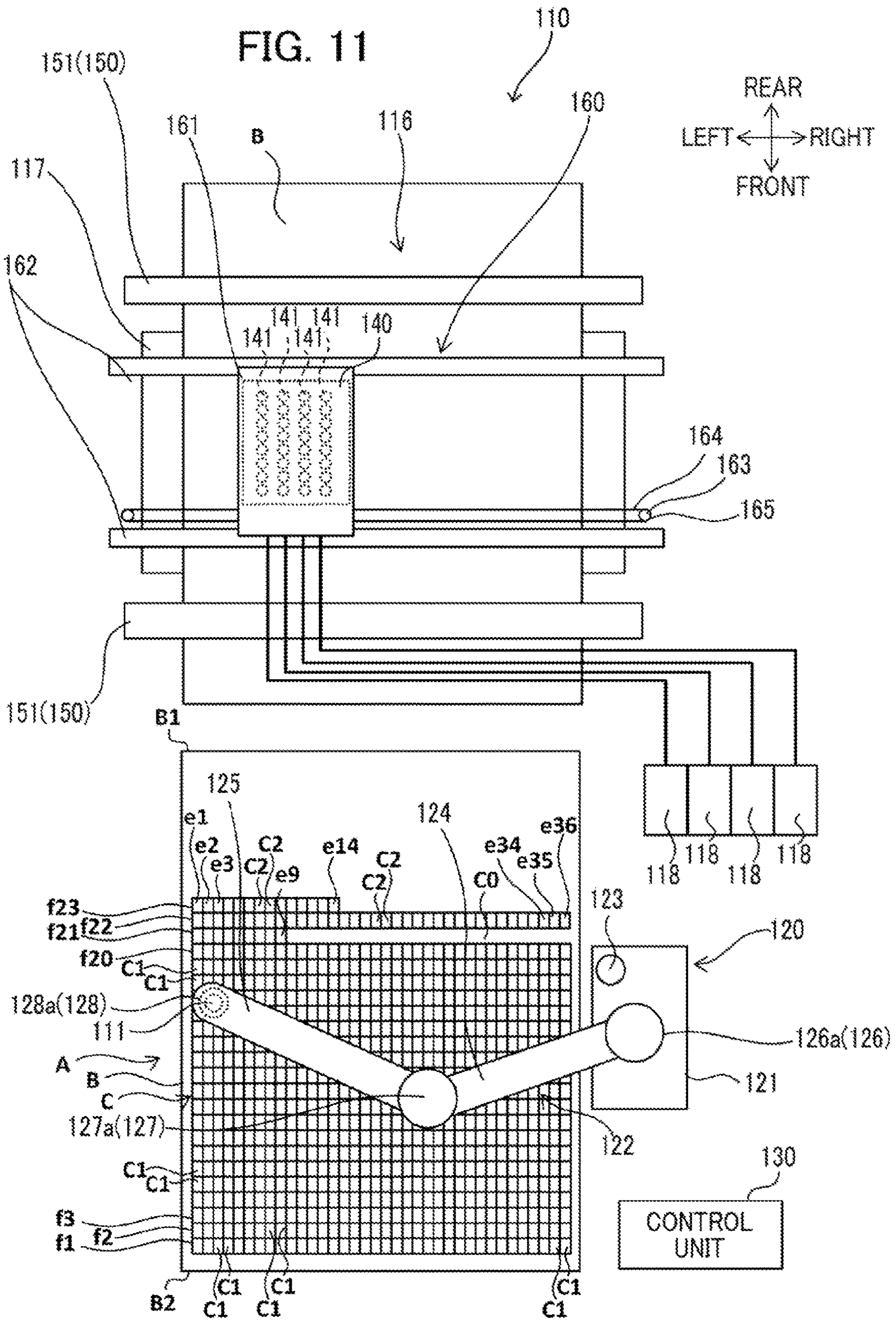
FIG. 11 illustrates a schematic plan view of still another example of a colorimetry system for printed matter.

When the print medium B has an upstream edge B1 and a downstream edge B2 relative to the conveying direction in which the print medium B is conveyed, as illustrated in the example of FIG. 11, the control unit 130 may print the patch chart C on the print medium B in the printing operation so that the patch chart C is closer to the downstream edge B2 than to the upstream edge B1 in the conveying direction and the first patch sets are closer to the downstream edge B2 than the second patch sets to the downstream edge B2 in the patch chart C.

Specifically, the printing unit 116 prints the patch chart C on the print medium B and conveys the printed matter A forward in the example of FIG. 11. In this case, the printing unit 116 prints the patch chart C on the print medium B so that the patch chart C is closer to the front edge, i.e., the downstream edge B2 of the print medium B, than the rear edge, i.e., the upstream edge B1 of the print medium B. This method makes the front margin between the front edge of the patch chart C and the front edge of the print medium B smaller than the rear margin between the rear edge of the patch chart C and the rear edge of the print medium B. As a result, the time required for the patch chart C printed by the printing unit 116 to reach the color measuring unit 111 disposed forward of the printing unit 116 is shorter in this case than when the front margin is greater than the rear margin. Therefore, the time between printing the patch chart C and measuring the colors of the patch chart C can be shortened.

In the above description, the color measuring unit 111 measures the colors of the first patches C1 and second patches C2 while in contact with the print medium B. However, the color measuring unit 111 may measure the colors of the first patches C1 and second patches C2 while the color measuring unit 111 is spaced apart from the print medium B.

Figure 12:
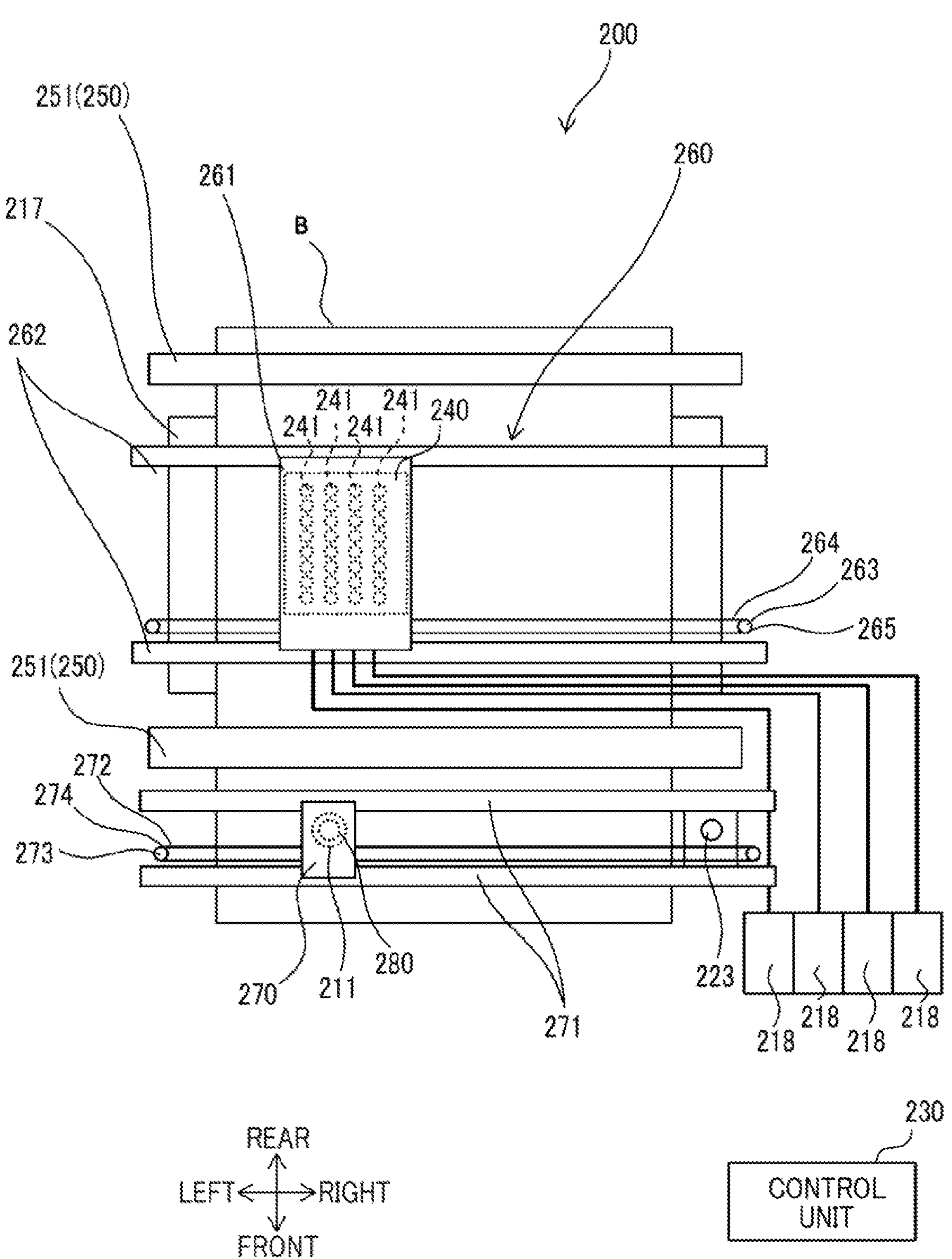
FIG. 12 illustrates a schematic plan view of an example of a printing device.
Figure 13:
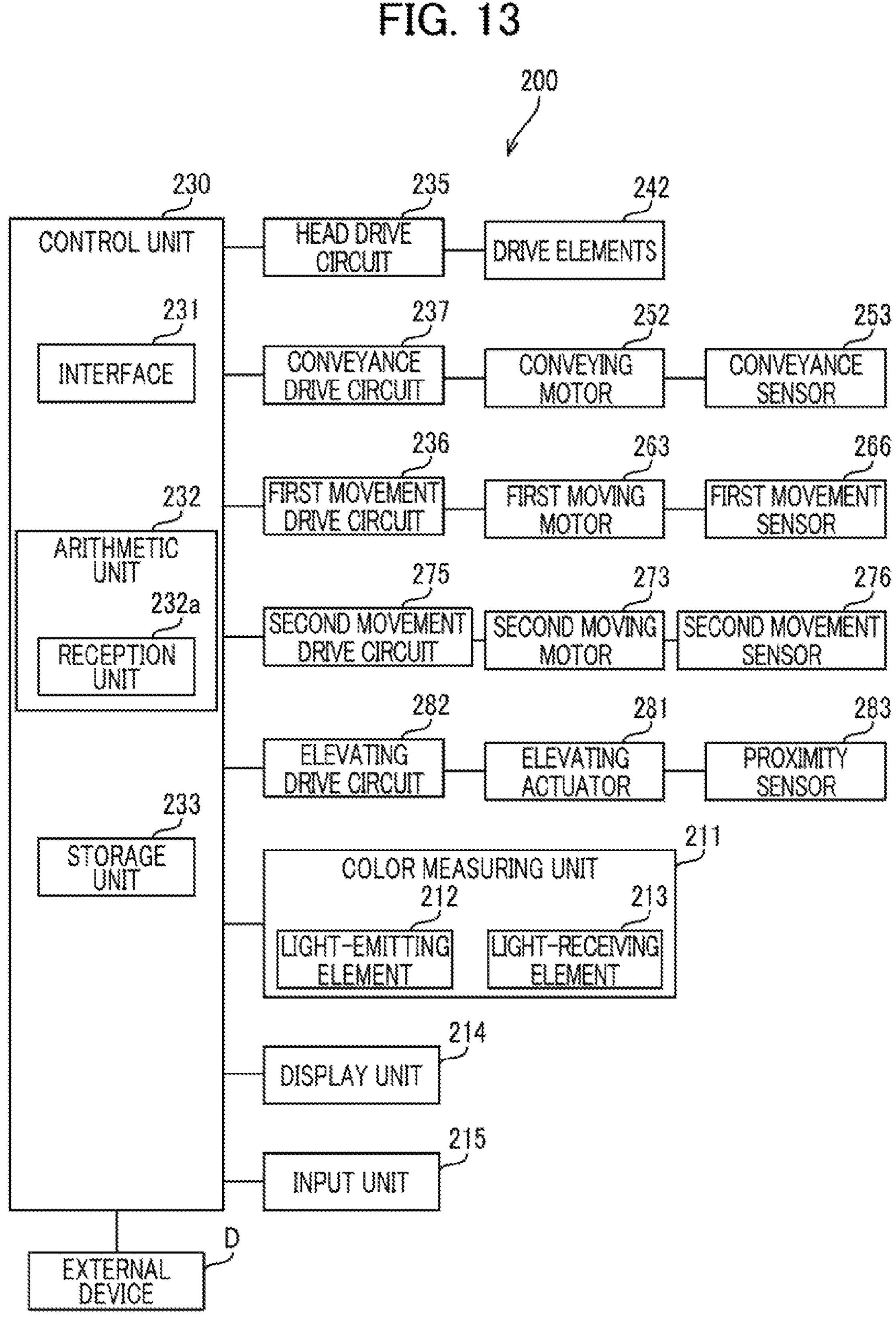
FIG. 13 is a block diagram illustrating the functional structure of the printing device illustrated in FIG. 12.
Figure 14:
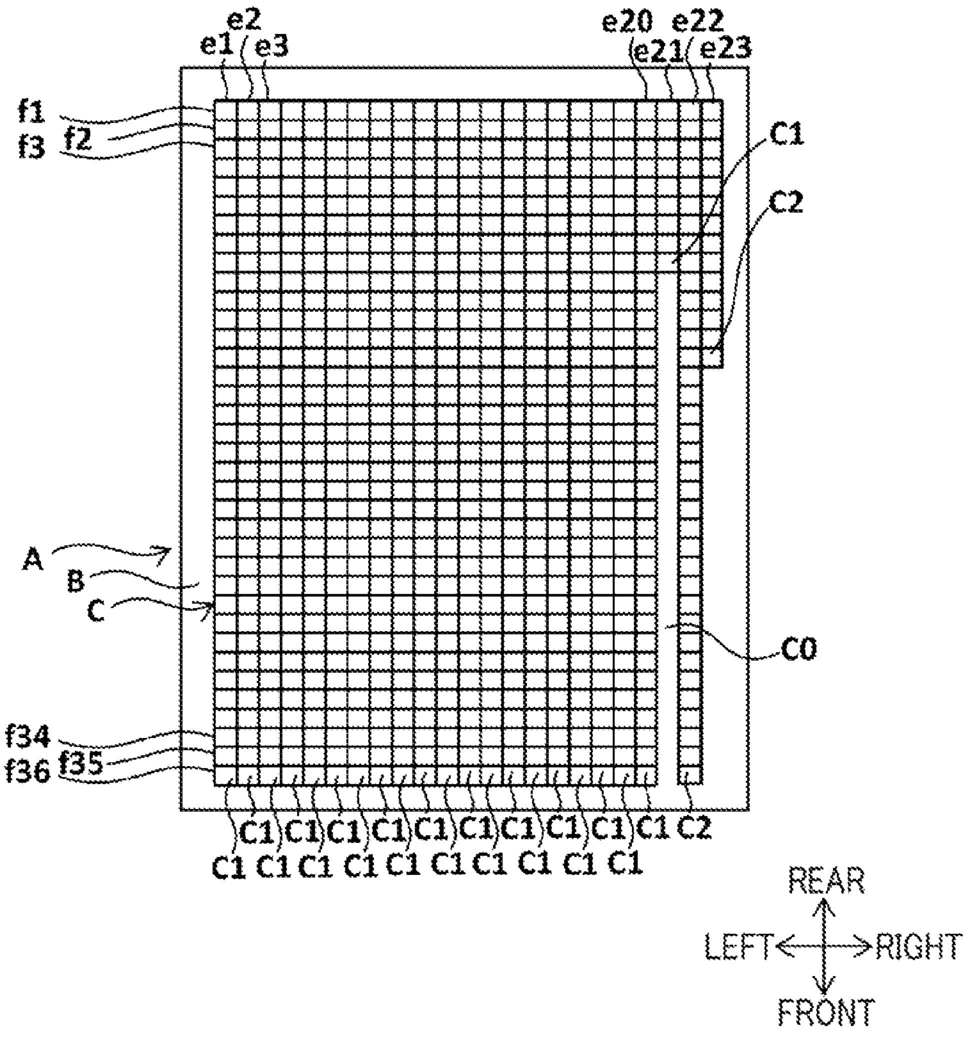
FIG. 14 illustrates an example of a patch chart including a plurality of patch sets each of which is a column having a plurality of patches of the same patch type aligned in a front-rear direction.

FIGS. 12 through 14 illustrate a printing device 200 according to a second embodiment of the present disclosure. As illustrated in the example of FIGS. 12 through 14, the printing device 200 is provided with: a head 240 having nozzles 241 that eject ink onto a print medium B; a first carriage 261 that supports the head 240 and moves in a first direction; a conveying unit 250 that conveys the print medium B in a second direction crossing the first direction; a color measuring unit 211 that measures a color of each of a plurality of patches included in a patch chart C printed on the print medium B; and a control unit 230. The patches include first patches C1 for predetermined first colors and second patches C2 for predetermined second colors. The control unit 230 executes a printing operation to print the patch chart C on the print medium B with ink ejected from the head 240. The control unit 230 executes a first color measuring operation to measure the colors of first patches C1 with the color measuring unit 211 while the conveying unit 250 moves the print medium B relative to the color measuring unit 211 on the basis of the patch information which includes information on the first patches C1 and second patches C2. The control unit 230 executes a second color measuring operation to measure the colors of second patches C2 with the color measuring unit 211 while the conveying unit 250 does not move the print medium B relative to the color measuring unit 211 on the basis of the patch information.

Below, the first direction in which the first carriage 261 moves will be called the left-right direction. Furthermore, the second direction that crosses (e.g., is orthogonal to) the first direction will be called the front-rear direction. Furthermore, a direction that crosses (e.g., is orthogonal to) the first direction and second direction will be called the up-down direction. However, the arrangement of the printing device 200 is not limited to these directions.

As illustrated in the example of FIGS. 12 and 13, in addition to the color measuring unit 211, control unit 230, head 240, and conveying unit 250, the printing device 200 is provided with a display unit 214, an input unit 215, a platen 217, a plurality of tanks 218, and a head moving unit 260. The structures of the color measuring unit 211, display unit 214, input unit 215, platen 217, tanks 218, control unit 230, head 240, conveying unit 250, and head moving unit 260 in the printing device 200 are the same as or similar to the structures of the color measuring unit 111, display unit 114, input unit 115, platen 117, tanks 118, control unit 130, head 140, conveying unit 150, and head moving unit 160 in the colorimetry system 110 of the second variation of the first embodiment. Thus, reference symbols for these components of the printing device 200 are formed by adding "100" to the reference symbols of corresponding components in the colorimetry system 110.

The printing device 200 is also provided with a second carriage 270 that supports the color measuring unit 211 and moves in the left-right direction. The second carriage 270 may be disposed forward of the head 240, i.e., downstream of the head 240 in the conveying direction of the print medium B. The second carriage 270 supports the color measuring unit 211. The second carriage 270 in turn is supported on two second guide rails 271 so as to be movable in the left-right direction. The second guide rails 271 extend in the left-right direction with the color measuring unit 211 interposed therebetween in the front-rear direction. A second endless belt 272 extending in the left-right direction is attached to the second carriage 270. The second endless belt 272 is also attached to a second moving motor 273 via a second pulley 274. When the second moving motor 273 is driven, the second endless belt 272 circulates, and the second carriage 270 reciprocates in the left-right direction along the second guide rails 271. In this way, the second carriage 270 moves the color measuring unit 211 in the left and right directions.

The control unit 230 is connected to the second moving motor 273 via a second movement drive circuit 275 and is connected to a second movement sensor 276, such as an encoder, that detects the position of the second carriage 270. The control unit 230 controls the driving of the second moving motor 273 on the basis of detection results from the second movement sensor 276. In this way, the control unit 230 controls movement of the second carriage 270 and color measuring unit 211 by the second moving motor 273 on the basis of detection values from the second movement sensor 276.

The printing device 200 is also provided with an elevating unit 280. The elevating unit 280 includes an elevating actuator 281 configured of a motor, solenoid, and the like, for example. The elevating unit 280 is connected to the second carriage 270 and color measuring unit 211. By moving the color measuring unit 211 upward and downward relative to the second carriage 270, the elevating unit 280 can place the color measuring unit 211 in contact with the print medium B and place the color measuring unit 211 spaced apart from the print medium B. The control unit 230 is connected to the elevating actuator 281 via an elevating drive circuit 282 and is connected to a proximity sensor 283, such as an encoder, for detecting the movement amount or the like of the elevating unit 280. The control unit 230 controls driving of the elevating actuator 281 on the basis of detection results from the proximity sensor 283. In this way, the control unit 230 controls movement of the color measuring unit 211 in the up-down direction with the elevating unit 280 on the basis of detection results from the proximity sensor 183.

In this way, the printing device 200 has the conveying unit 250, second carriage 270, and elevating unit 280 that function as a relative movement unit for moving the print medium B and the color measuring unit 111 relative to each other. The conveying unit 250 moves the print medium B relative to the color measuring unit 211 in the front-rear direction, the second carriage 270 moves the color measuring unit 211 relative to the print medium B in the left-right direction, and the elevating unit 280 moves the color measuring unit 211 relative to the print medium B in the up-down direction. Thus, the conveying unit 250, second carriage 270, and elevating unit 280 move the color measuring unit 211 relative to the print medium B.

A white point 223 for calibrating the color measuring unit 211 is disposed in an area where the color measuring unit 211 can measure. For example, the white point 223 is disposed in an area to which the second carriage 270 can move the color measuring unit 211 in the left-right direction and where the color measuring unit 211 can oppose the white point 223 in the up-down direction. The white point 223 has a predetermined color value represented by color coordinates in a device-independent color space, such as a Lab value, and this color value is stored in a storage unit 233.

The relative movement unit of the printing device 200 may possess a base and an arm similar to the moving units 20 and 120 in the colorimetry systems 10 and 110 of the first embodiment and the variations thereof. Alternatively, the relative movement unit of the printing device 200 may include an arm similar to the arms 22 and 122 of the colorimetry systems 10 and 110 but provided on the second carriage 270. In this case, the arm may move the color measuring unit 211 relative to the print medium B.

Figure 19:
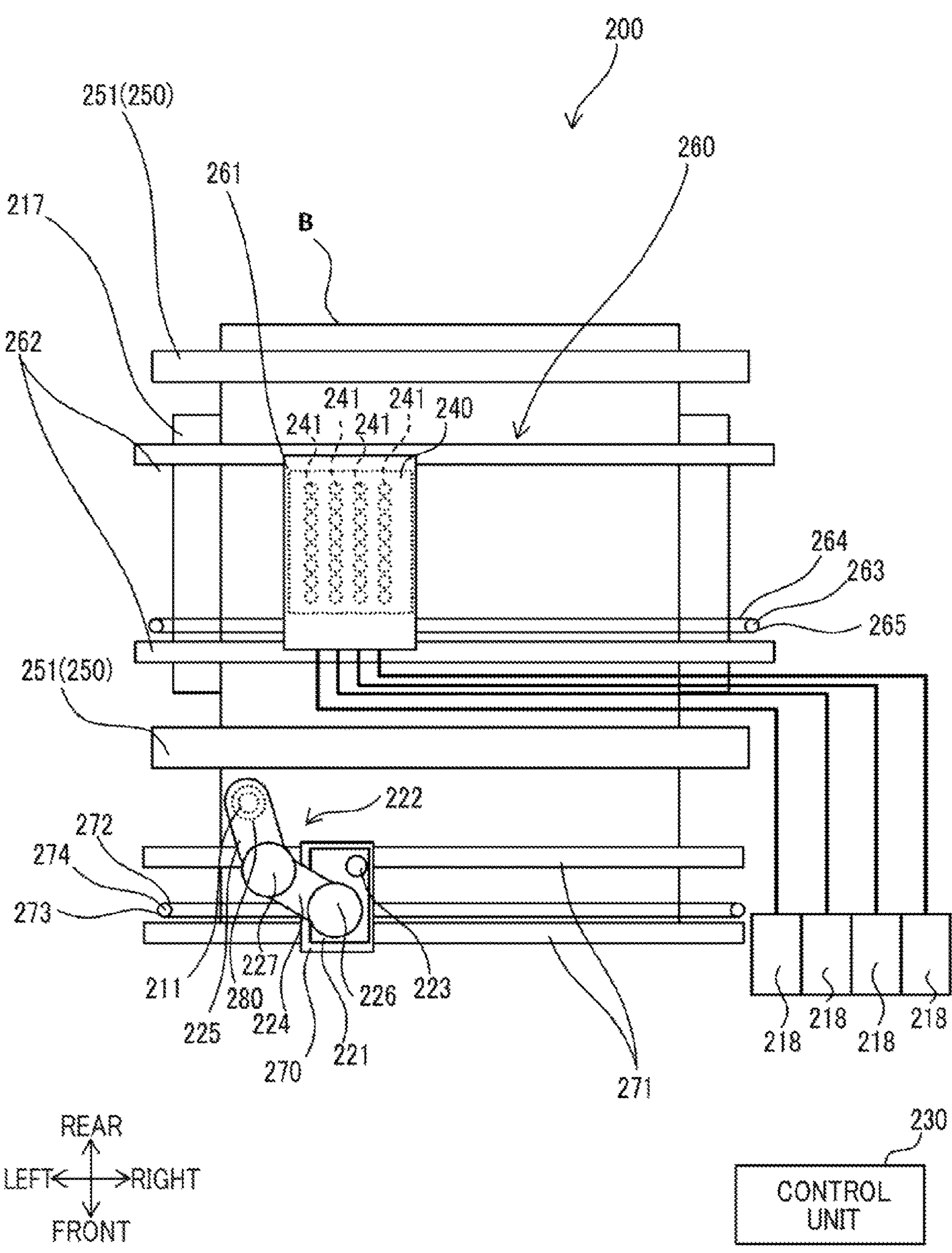
FIG. 19 illustrates a schematic plan view of another example of a printing device.

When an arm 222 is provided on the second carriage 270, as illustrated in the example of FIG. 19, the white point 223 may also be provided on the second carriage 270. The arm 222 has a structure identical or similar to the arms 22 and 122 of the colorimetry systems 10 and 110 and, hence, the reference symbol for the arm 222 is formed by adding "200" or "100" to the reference symbol of the arm 22 in the colorimetry system 10 or the arm 122 in the colorimetry system 110.

In this case, the arm 222 moves the color measuring unit 211 to the white point 223 on the second carriage 270 and the color measuring unit 211 measures the color of the white point 223. Since the white point 223 moves together with the color measuring unit 211 in the left-right direction when the second carriage 270 moves the color measuring unit 211, the second carriage 270 need not move the color measuring unit 211 to the position of the white point 223. Accordingly, the color measuring unit 211 can easily measure the color of the white point 223 when undergoing calibration.

<Method of Controlling the Printing Device>

Figure 15:
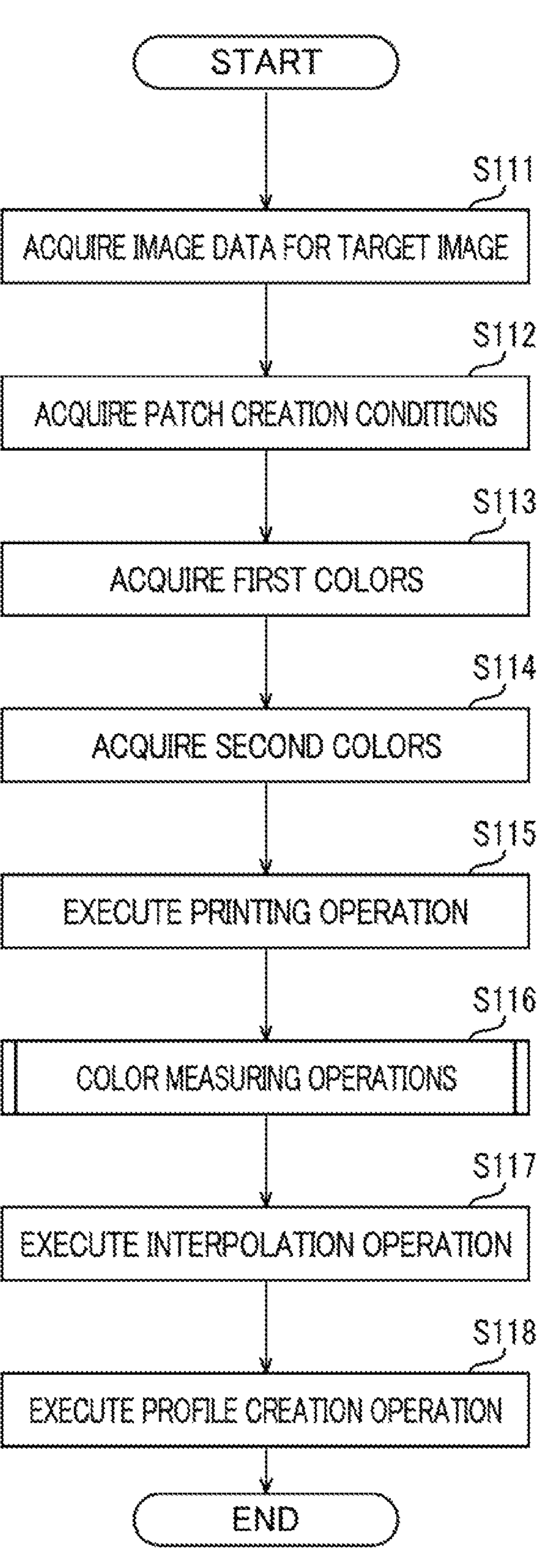
FIG. 15 is a flowchart illustrating steps in an example of a control method of the printing device illustrated in FIG. 12.

FIG. 15 is a flowchart illustrating an example of a method of controlling the printing device 200 executed by the control unit 230. The control unit 230 executes steps in this flowchart upon receiving printing instructions from the user through the input unit 215. The process performed on the printing device 200 in the flowchart of FIG. 15 is identical or similar to the process performed on the colorimetry system 110 in the flowchart of FIG. 10. Therefore, step numbers in the process performed on the printing device 200 are formed by adding "100" to the step numbers for corresponding steps in the process performed on the colorimetry system 110.

In the example of the flowchart of FIG. 15, the control unit 230 acquires image data for the target image G, patch creation conditions, first colors of the first patches C1, and second colors of the second patches C2 (S111 through S114). The first colors are colors included in the printable color gamut of the printing device 200. For example, the first colors are color values acquired from among a plurality of color values stored in the storage unit 233 and constituting the color gamut of the printing device 200 in steps at prescribed gradation intervals. The second colors are colors designated by the user on the basis of a reception unit 232*a*. For example, the second colors are color values received by the reception unit 232*a* when the user designates colors in the target image G displayed on the display unit 214 using the input unit 215. In this case, the control unit 230 functions as the reception unit 232*a*.

On the basis of the acquired information, in S115 the control unit 230 executes a printing operation to print the patch chart C, as illustrated in the example of FIG. 14. In this printing operation, the control unit 230 generates image data for the patch chart C and stores the patch information illustrated in the example of FIG. 3 in the storage unit 233. Next, the control unit 230 prints the patch chart C on the print medium B based on this image data by ejecting ink from the nozzles 241 of the head 240. The control unit 230 controls the conveying unit 250 to convey the printed matter A having this patch chart C printed on the print medium B forward and supplies the printed matter A to the color measuring unit 211 disposed forward of the head 240.

In S116 the control unit 230 executes the color measuring operations. In these operations, the control unit 230 executes the process of S101 through S107 in the flowchart of FIG. 16, for example. The process in S101 through S107 executed by the printing device 200 is identical or similar to the process executed by the colorimetry system 10 in the flowchart of FIG. 4. Steps in the color measuring operations performed by the printing device 200 are designated with step numbers S101 through S107, which are formed by adding "100" to the step numbers S1 through S7 in the corresponding steps performed by the colorimetry system 10. The correction operation in S102 may be omitted when the positions of patches relative to the relative movement unit, e.g. the second carriage 270, can be acquired based on detection results from a conveyance sensor 253, a first movement sensor 266, the second movement sensor 276, and the proximity sensor 283. In this case, the first and second color measuring operations are executed on the basis of the positions of patches relative to the relative movement unit, e.g., the second carriage 270, on the basis of the detection results from the sensors.

Figure 16:
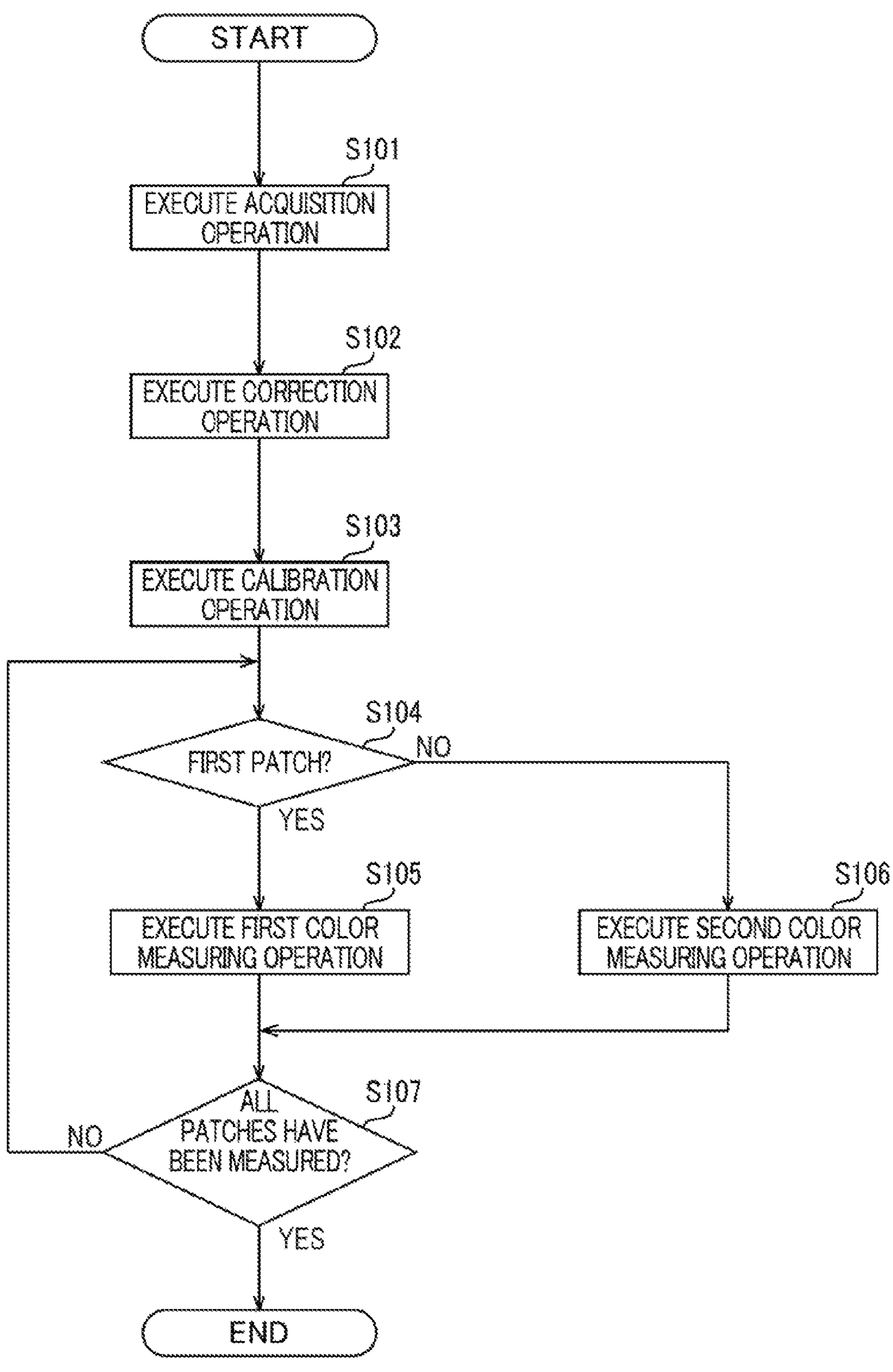
FIG. 16 is a flowchart illustrating steps in an example of color measuring operations performed on the printing device illustrated in FIG. 12.

FIG. 16 is a flowchart illustrating an example of steps in the color measuring operations. In S101 of FIG. 16 the control unit 230 executes the acquisition operation to acquire patch information illustrated in the example of FIG. 3 from the storage unit 233. The patch information includes information for each of the plurality of patches included in the patch chart C such as the patch position of the patch in the patch chart C and the patch type of the patch (i.e., whether the patch is a first patch C1 or a second patch C2). The patch information is stored in the storage unit 233. The patch information also includes information about the patch positions and patch type of the second patches C2 corresponding to the second colors received by the reception unit 232*a*. As described above, the control unit 230 functions as the reception unit 232*a* for receiving destination of the second colors by the user.

In S104 the control unit 230 executes the determination operation to determine on the basis of the patch information whether the patch subjected to the color measurement is a first patch C1 or a second patch C2. Next, the control unit 230 executes either the first color measuring operation or the second color measuring operation based on the results of the determination in S104 on the basis of the patch information in the example of FIG. 3.

Here, when the control unit 230 determines that the patch subjected to the color measurement is a first patch C1 (S104: YES), in S105 the control unit 230 executes the first color measuring operation. In the first color measuring operation, the control unit 230 controls the elevating unit 280 to bring the color measuring unit 211 into contact with the print medium B when the color measuring unit 211 is spaced apart from the print medium B. Next, the control unit 230 controls the conveying unit 250 to convey the print medium B in the front-rear direction so that the color measuring unit 211 moves to the first patch C1 subjected to the color measurement on the print medium B while remaining in contact with the print medium B. Subsequently, the control unit 230 performs the color measurement with the color measuring unit 211 while moving the color measuring unit 211 over the first patch C1 without halting the movement of the color measuring unit 211 and stores the colorimetric value of the first patch C1 in association with the patch position of the first patch C1 in the patch information stored in the storage unit 233. Next, the control unit 230 controls at least one of the conveying unit 250 and second carriage 270 to move the color measuring unit 211 to a predetermined position on the print medium B or to the next patch to be subjected to the color measurement.

On the other hand, when the control unit 230 determines that the patch subjected to the color measurement is a second patch C2 (S104: NO), the control unit 230 executes the second color measuring operation in S106. In the second color measuring operation, the control unit 230 controls the elevating unit 280 to move the color measuring unit 211 upward. Next, the control unit 230 controls the conveying unit 250 to convey the print medium B in the front-rear direction in order to move the color measuring unit 211 to the second patch C2 subjected to the color measurement on the print medium B while the color measuring unit 211 remains spaced apart from the print medium B. Next, the control unit 230 halts the movement of the color measuring unit 211 above the second patch C2. In this halted state of the color measuring unit 211, i.e., while the horizontal movement of the color measuring unit 211 is halted, the control unit 230 controls the elevating unit 280 to place the color measuring unit 211 in contact with the print medium B. Subsequently, the control unit 230 measures the color of the second patch C2 with the color measuring unit 211 while the color measuring unit 211 is in contact with the print medium B and stores the colorimetric value of the second patch C2 in association with the patch position of the second patch C2 in the patch information stored in the storage unit 233. Next, the control unit 230 controls the elevating unit 280 to move the color measuring unit 211 upward and controls at least one of the conveying unit 250 and second carriage 270 to move the color measuring unit 211 relative to the print medium B to a predetermined position on the print medium B or to the next patch to be subjected to the color measurement while the color measuring unit 211 remains spaced apart from the print medium B.

Thus, the control unit 230 can measure the colors of the first patches C1 rapidly in the first color measuring operation by not stopping the color measuring unit 211 during measurements. In the second color measuring operation, the control unit 230 can measure the colors of the second patches C2 accurately by stopping the color measuring unit 211 during measurements. Hence, the above operations can achieve an optimal balance between time and accuracy in measuring color of patches on the basis of the patch types of the patches.

When colors of all patches in the patch chart C have been measured in this way (S107: YES), the control unit 230 ends the color measurement operations, and in S117 of FIG. 15, the control unit 230 executes an interpolation operation to interpolate first colors in the color gamut of the printing unit 216 on the basis of the second colors. In S118 the control unit 230 executes a profile creating operation to create a color calibration profile. Since this color calibration profile is based on the colorimetric values of the second colors specified by the user, the control unit 230 can bring the colors in the printed target image G closer to the target Lab values by calibrating and printing the image data for the target image G on the basis of the color calibration profile.

Note that in steps S115 and S116 of FIG. 15, the control unit 320 may execute the first or second color measuring operations while executing the printing operation. This method can shorten the time between printing and measuring colors of the patch chart C.

In the printing device 200 according to a third variation, which is a variation of the second embodiment described above, the patches described in the second embodiment are configured in a plurality of patch sets having patches aligned in the second direction, as illustrated in the example of FIGS. 12 through 14. The patch sets are juxtaposed in the first direction and have first patch sets configured of first patches C1 and second patch sets configured of second patches C2. In the first color measuring operation, the control unit 230 controls the color measuring unit 211 to measure the colors of the plurality of first patches C1 included in a first patch set while the conveying unit 250 causes the color measuring unit 211 to move along the first patch set relative to the print medium B in the second direction. In the second color measuring operation, the control unit 230 controls the color measuring unit 211 to measure the colors of the plurality of second patches C2 included in a second patch set while the conveying unit 250 causes the color measuring unit 211 to repeatedly move and halt along the second patch set relative to the print medium B in the second direction.

Specifically, the patch chart C is configured of a plurality of patches aligned in the front-rear direction and the left-right direction to configure a grid pattern, as illustrated in the example of FIG. 14. The plurality of patches has columns aligned in the front-rear direction and rows aligned in the left-right direction. When the second direction is the front-rear direction, for example, the patch sets are columns having a plurality of patches aligned in the front-rear direction. Of these patch sets, the first patch sets are columns of first patches C1 having a plurality of first patches C1 aligned in the front-rear direction and including no second patches C2, and the second patch sets are columns of second patches C2 having a plurality of second patches C2 aligned in the front-rear direction and including no first patches C1. The first column e1 through twenty-first column e21 of first patches C1 and the twenty-second column e22 and twenty-third column e23 of second patches C2 are all arranged at different positions from each other in the left-right direction. In other words, the first patch sets and second patch sets are arranged at different positions from each other in the first direction.

Figure 17:
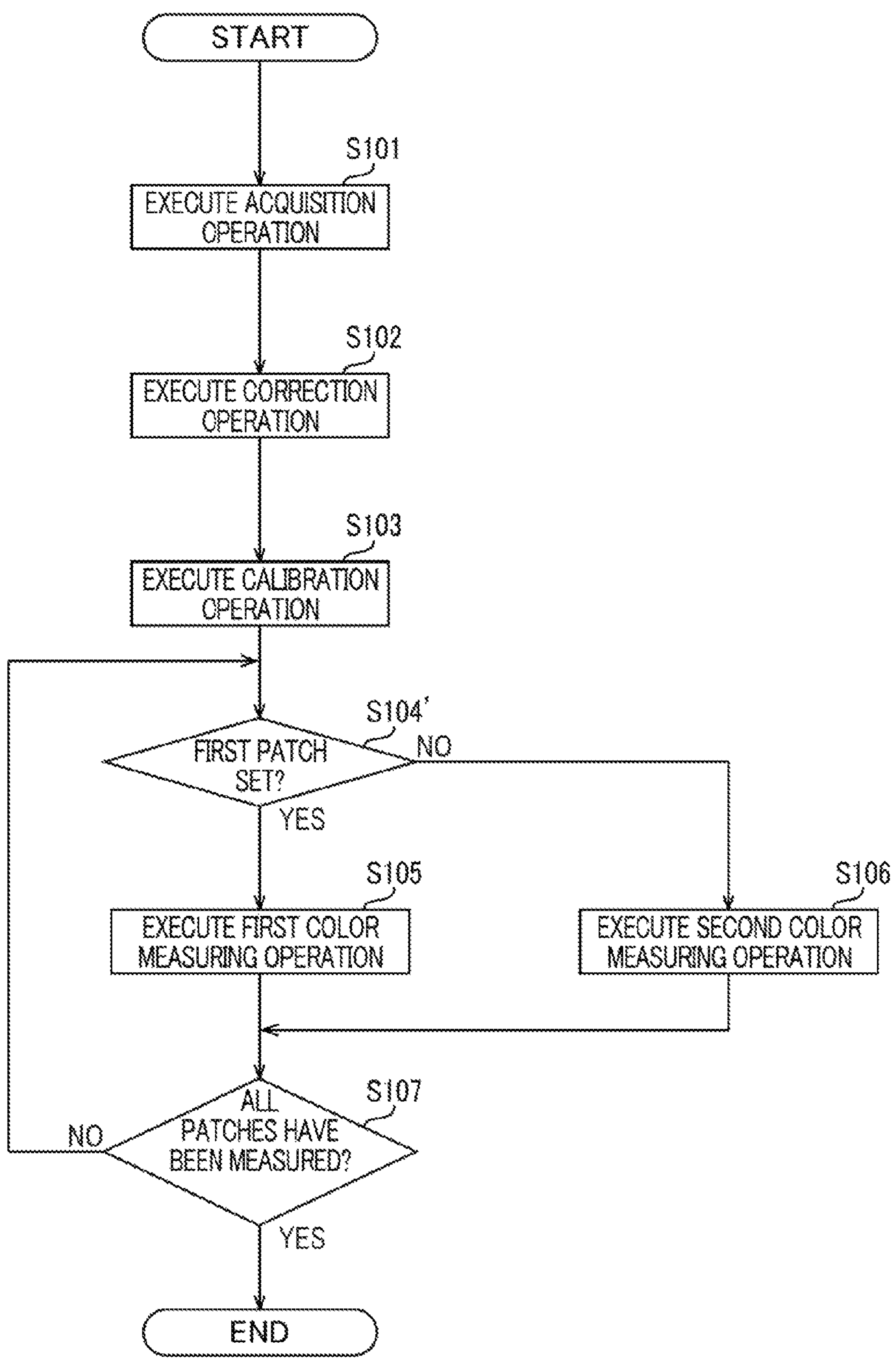
FIG. 17 is a flowchart illustrating steps in another example of color measuring operations performed on the printing device illustrated in FIG. 12.

FIG. 15 is a flowchart illustrating an example of a method of controlling the printing device 200 having this configuration. The control unit 230 of the printing device 200 executes the steps in the flowchart of FIG. 15. In the color measuring operations of S116 in FIG. 15, the control unit 230 executes steps S101 through S107 in the flowchart of FIG. 17. In the flowchart of FIG. 17, the control unit 230 executes the process of S104' in place of the process of S104 in the flowchart of FIG. 16.

S104' is also a determination operation in which the control unit 230 determines whether each of the plurality of patch sets is a first patch set or a second patch set on the basis of the patch information. In this determination operation, the control unit 230 acquires, as a patch set, a column of patches (hereinafter referred to as "patch column") in the patch chart C on the basis of the patch positions of patches in the patch information illustrated in the example of FIG. 3 and determines for each patch column whether the patch column subjected to the color measurements is a first patch set or a second patch set on the basis of the patch types of the patches in that column.

When the control unit 230 determines in the determination operation that the patch column subjected to the color measurements is a column of first patches C1, i.e., a first patch set (S104': YES), in S105 the control unit 230 executes the first color measuring operation. In this first color measuring operation, the control unit 230 controls the elevating unit 280 to move the color measuring unit 211 downward until the color measuring unit 211 contacts the print medium B, for example. Next, when the control unit 230 is measuring the colors of the first patches C1 in the first column e1 on the print medium B, i.e., when the first patches C1 in the first column e1 is determined to be a first patch set subjected to the color measurements in S104', the control unit 230 controls the conveying unit 250 to move the print medium B in the front-rear direction relative to the color measuring unit 211 until the color measuring unit 211 is disposed above or rearward of the first patch C1 positioned in the first column e1 and first row f1, and then controls the second carriage 270 to move the color measuring unit 211 in the left-right direction relative to the print medium B.

Subsequently, the control unit 230 controls the conveying unit 250 to convey the print medium B rearward so as to move the color measuring unit 211 forward along the first column e1 relative to the print medium B while the color measuring unit 211 remains in contact with the print medium B. Next, the control unit 230 conveys the print medium B so that the color measuring unit 211 moves relative to the print medium B over the first patches C1 in the first row f1 through thirty-sixth row f36 of the first column e1 without halting the movement of the color measuring unit 211 relative to the print medium B while measuring the color of each of these first patches C1 with the color measuring unit 211. In this way, the control unit 230 measures the colors of the first patches C1 in the first row f1 through thirty-sixth row f36 of the first column e1 and stores the colorimetric value of each first patch C1 in the patch information of the storage unit 233 in association with the patch position of the corresponding first patch C1. Subsequently, the control unit 230 controls at least one of the conveying unit 250 and second carriage 270 to move the color measuring unit 211 to a predetermined position on the print medium B or to the next patch column to be subjected to the color measurements.

On the other hand, when the control unit 230 determines in the determination operation that the patch column subjected to the color measurements is a column of second patches C2, i.e., a second patch set (S104': NO), in S106 the control unit 230 executes the second color measuring operation. In this second color measuring operation, when the control unit 130 is measuring the colors of the second patches C2 in the twenty-second column e22, i.e., when the second patches C2 in the twenty-second column e22 is determined to be a second patch set subjected to the color measurements in S4', for example, the control unit 230 controls at least one of the conveying unit 250 and second carriage 270 to move the color measuring unit 211 relative to the print medium B until the color measuring unit 211 is positioned above or rearward of the second patch C2 positioned in the twenty-second column e22 and first row f1.

Subsequently, the control unit 230 controls the conveying unit 250 to convey the print medium B rearward so that the color measuring unit 211 moves forward relative to the print medium B along the twenty-second column e22 while the color measuring unit 211 remains spaced apart from the print medium B. At this time, the control unit 230 stops conveyance by the conveying unit 250 each time the color measuring unit 211 arrives at a predetermined position in each second patch C2 of the twenty-second column e22, such as the center of the second patch C2.

While the color measuring unit 211 is stationary relative to the print medium B, i.e., while the horizontal movement of the color measuring unit 211 relative to the print medium B is halted, the control unit 230 moves the color measuring unit 211 in the up-down direction to bring the color measuring unit 211 into contact with the print medium B from a position in which the color measuring unit 211 is spaced apart from the print medium B and measures the color of the second patch C2 with the color measuring unit 211 while the color measuring unit 211 is in contact with the print medium B. Furthermore, while the color measuring unit 211 remains stationary relative to the print medium B, i.e., while the horizontal movement of the color measuring unit 211 relative to the print medium B remains halted, the control unit 230 moves the color measuring unit 211 in the up-down direction to place the color measuring unit 211 spaced apart from the print medium B and subsequently controls the conveying unit 250 to convey the print medium B rearward in order to measure the next patch.

Thus, for each second patch C2 in the first row f1 through thirty-sixth row f36 of the twenty-second column e22, the control unit 230 controls the conveying unit 250 to convey the print medium B so that the color measuring unit 211 moves along the twenty-second column e22 while the color measuring unit 211 is spaced apart from the print medium B. At this time, the control unit 230 repeatedly halts conveyance of the print medium B with the conveying unit 250 so that the color measuring unit 211 can measure each second patch C2 while the color measuring unit 211 is in contact with the print medium B after halted the horizontal movement of the color measuring unit 211 above the center of the second patch C2. As a result, the control unit 130 acquires the colorimetric value of each second patch C2 in the first row f1 through thirty-sixth row f36 of the twenty-second column e22 and stores the colorimetric values of the second patches C2 in the patch information stored in the storage unit 233 in association with the patch positions of the second patches C2. Subsequently, the control unit 230 controls at least one of the conveying unit 250 and second carriage 270 to move the color measuring unit 211 to a predetermined position relative to the print medium B or to the next patch column to be subjected to the color measurements.

Next, when there remain any patches to be measured (S107: NO), the control unit 230 returns to the process of S104' and repeats the process from S104' to S107. In the example of FIG. 14, the control unit 230 executes the first color measuring operation in S105 on patches in each of the first column e1 through twenty-first column e21. Additionally, the control unit 230 executes the second color measuring operation of S106 on patches in each of the twenty-second column e22 and twenty-third column e23. Once all patches in the patch chart C have been measured (S107: YES), the control unit 230 ends the color measuring operations. These first and second color measuring operations can achieve an optimal balance between time and accuracy in measuring colors of patches on the basis of the patch types of patch sets. Furthermore, since the columns of first patches C1 and columns of second patches C2 in the patch chart C are arranged at different positions from each other in the left-right direction, the first color measuring operation or second color measuring operation can be performed uniformly for individual columns.

In the above description, the color measuring unit 211 measures colors of first patches C1 and second patches C2 while in contact with the print medium B. However, the color measuring unit 211 may measure colors of the first patches C1 and second patches C2 while spaced apart from the print medium B.

Figure 18:
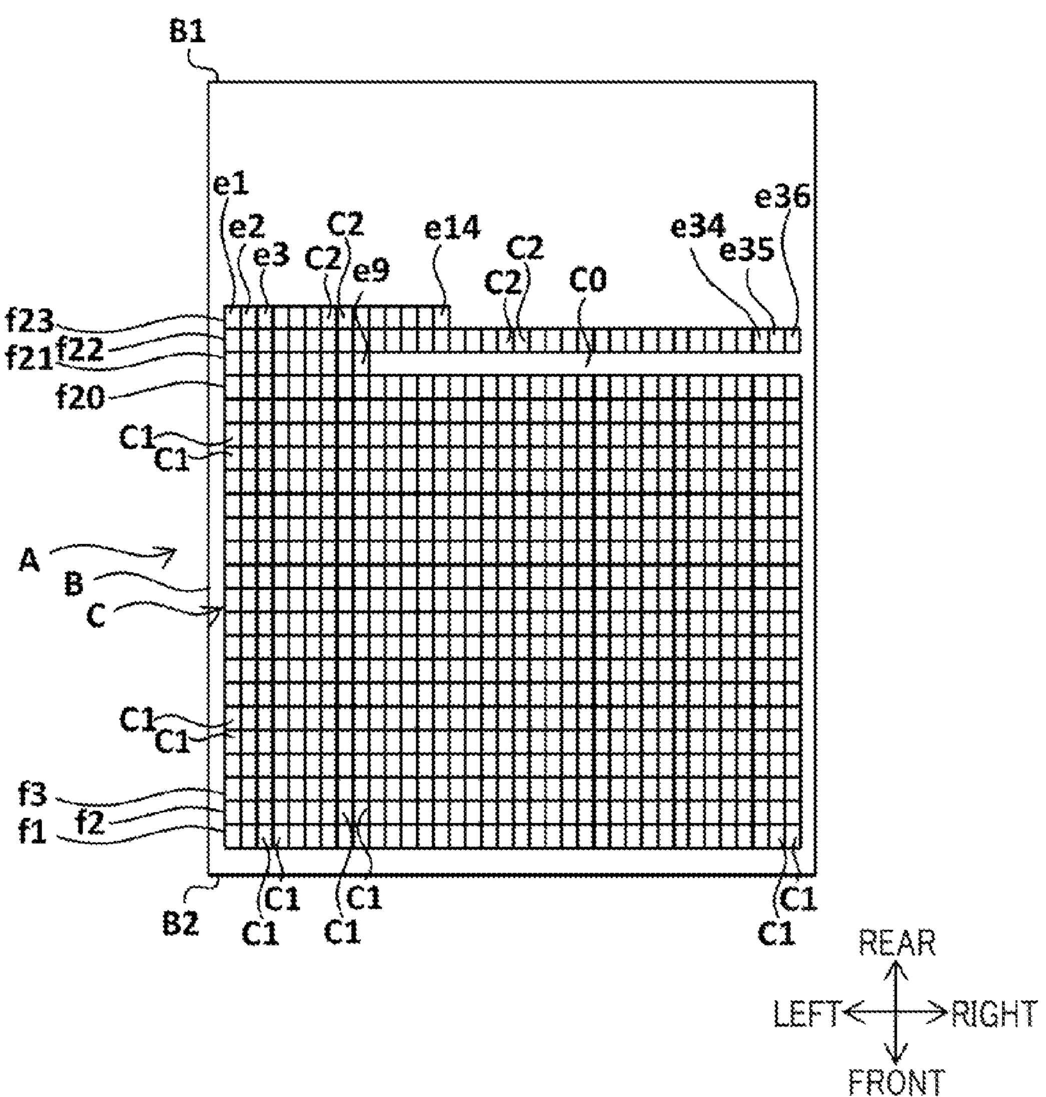
FIG. 18 illustrates an example of a patch chart including a plurality of patch sets each of which is a row having a plurality of patches of the same patch type aligned in a left-right direction.

As illustrated in the example of FIGS. 12, 13, and 18, the printing device 200 according to a third embodiment of the present disclosure is provided with: the head 240 having the nozzles 241 that eject ink onto a print medium B; the first carriage 261 that supports the head 240 and moves in a first direction; the conveying unit 250 that conveys the print medium B in a second direction crossing the first direction; the color measuring unit 211 that measures colors of a plurality of patches included in a patch chart C printed on the print medium B; the second carriage 270 that supports the color measuring unit 211 and moves in the first direction; and the control unit 230. The patches include first patches C1 for predetermined first colors and second patches C2 for predetermined second colors. The control unit 230 executes: a printing operation to print the patch chart C on the print medium B with ink ejected from the head 240; the first color measuring operation to measure colors of the first patches C1 with the color measuring unit 211 while the second carriage 270 moves in the first direction on the basis of the patch information which includes information on the first patches C1 and second patches C2; and the second color measuring operation to measure colors of the second patches C2 with the color measuring unit 211 while the second carriage 270 halts in the first direction on the basis of the patch information.

FIG. 15 is a flowchart illustrating an example of a method of controlling the printing device 200 executed by the control unit 230. In S115 of this process, the control unit 230 executes a printing operation to print the patch chart C on the print medium B with ink ejected from the head 240 on the basis of the patch information illustrated in the example of FIG. 3, as illustrated in the example of FIG. 18. The control unit 230 conveys the printed matter A having this patch chart C printed on the print medium B forward and supplies the printed matter A to the color measuring unit 211, which is disposed forward of the head 240.

In S116 the control unit 230 executes the color measuring operations. In these operations, the control unit 230 executes the process of S101 through S107 in the flowchart of FIG. 16, for example. In S104 of FIG. 16, the control unit 230 executes the determination operation to determine on the basis of the patch information whether the patch subjected to the color measurement is a first patch C1 or a second patch C2. As described above, the correction operation in S102 may be omitted from the color measuring operations.

When the control unit 230 determines that the patch subjected to the color measurement is a first patch C1 (S104: YES), in S105 the control unit 230 executes the first color measuring operation. In the first color measuring operation, the control unit 230 controls the elevating unit 280 to bring the color measuring unit 211 into contact with the print medium B, when the color measuring unit 211 is spaced apart from the print medium B. Next, the control unit 230 controls the second carriage 270 to move the color measuring unit 211 to the first patch C1 subjected to the color measurement on the print medium B while the color measuring unit 211 remains in contact with the print medium B. Subsequently, the control unit 230 performs the color measurement with the color measuring unit 211 while moving the color measuring unit 211 over the first patch C1 without halting the movement of the color measuring unit 211 and stores the colorimetric value of the first patch C1 in association with the patch position of the first patch C1 in the patch information stored in the storage unit 233. Next, the control unit 230 controls at least one of the conveying unit 250 and second carriage 270 to move the color measuring unit 211 to a predetermined position on the print medium B or to the next patch to be subjected to the color measurement.

On the other hand, when the control unit 230 determines that the patch subjected to the color measurement is a second patch C2 (S104: NO), the control unit 230 executes the second color measuring operation in S106. In the second color measuring operation, the control unit 230 controls the elevating unit 280 to move the color measuring unit 211 upward. Next, the control unit 230 controls the second carriage 270 to move the color measuring unit 211 to the second patch C2 subjected to the color measurement on the print medium B while the color measuring unit 211 remains spaced apart from the print medium B. Subsequently, the control unit 230 halts the movement of the color measuring unit 211 above the second patch C2, and in this stationary state of the color measuring unit 211, i.e., while the horizontal movement of the color measuring unit 211 is halted, the control unit 230 controls the elevating unit 280 to place the color measuring unit 211 in contact with the print medium B. Next, the control unit 230 measures the color of the second patch C2 with the color measuring unit 211 while the color measuring unit 211 is in contact with the print medium B and stores the colorimetric value of the second patch C2 in association with the patch position of the second patch C2 in the patch information stored in the storage unit 233. Next, the control unit 230 controls the elevating unit 280 to move the color measuring unit 211 upward and controls at least one of the conveying unit 250 and second carriage 270 to move the color measuring unit 211 relative to the print medium B to a predetermined position on the print medium B or to the next patch to be subjected to the color measurement while the color measuring unit 211 remains spaced apart from the print medium B.

Thus, the control unit 230 can measure the colors of the first patches C1 rapidly in the first color measuring operation by not halting the movement of the color measuring unit 211 during measurements. In the second color measuring operation, the control unit 230 can measure the colors of the second patches C2 accurately by halting the movement of the color measuring unit 111 during measurements. Hence, the above operations can achieve an optimal balance between time and accuracy in measuring colors of patches on the basis of the patch types of the patches. Note that in S114 and S115 of FIG. 12, the control unit 130 may execute the first color measuring operation or second color measuring operation while executing the printing operation. This method can shorten the time between printing and measuring colors of the patch chart C.

When the colors of all patches in the patch chart C have been measured in this way (S107: YES), the control unit 230 ends the color measurement operations, and in S117 of FIG. the control unit 230 executes an interpolation operation to interpolate first colors in the color gamut of the printing unit 216 on the basis of the second colors. In S118 the control unit 230 executes a profile creating operation to create a color calibration profile. Since this color calibration profile is based on the colorimetric values of the second colors specified by the user, the control unit 320 can bring the colors in the printed target image G closer to the target Lab values by calibrating and printing the image data for the target image G on the basis of the color calibration profile.

In the printing device 200 according to a fourth variation, which is a variation of the third embodiment described above, the patches described in the third embodiment are configured in a plurality of patch sets having patches aligned in the first direction. The patch sets are juxtaposed in the second direction and have first patch sets configured of first patches C1 and second patch sets configured of second patches C2. In the first color measuring operation, the control unit 230 controls the color measuring unit 211 to measure the colors of the plurality of first patches included in a first patch set while the second carriage 270 moves the color measuring unit 211 along the first patch set relative to the print medium B in the first direction. In the second color measuring operation, the control unit 230 controls the color measuring unit 211 to measure the colors of the plurality of second patches included in a second patch set while the second carriage 270 repeatedly moves and halts the color measuring unit 211 along the second patch set relative to the print medium B in the first direction.

Specifically, the patch chart C is configured of a plurality of patches aligned in the front-rear direction and the left-right direction to configure a grid pattern, as illustrated in the example of FIG. 18. The plurality of patches has columns aligned in the front-rear direction and rows aligned in the left-right direction. When the second direction is the left-right direction, for example, the patch sets are rows having a plurality of patches aligned in the left-right direction. Of these patch sets, the first patch sets are rows of first patches C1 having a plurality of first patches C1 aligned in the left-right direction and including no second patches C2, and the second patch sets are rows of second patches C2 having a plurality of second patches C2 aligned in the left-right direction and including no first patches C1. The first row f1 through twenty-first row f21 of first patches C1 and the twenty-second row f23 and twenty-third row f23 of second patches C2 are all arranged at different positions from each other in the front-rear direction. In other words, the first patch sets and second patch sets are arranged at different positions from each other in the second direction.

FIG. 15 is a flowchart illustrating an example of a method of controlling the printing device 200 having this configuration. The control unit 230 of the printing device 200 executes the steps in the flowchart of FIG. 15. In the color measuring operations of S116 in FIG. 15, the control unit 230 executes the color measuring operations in the flowchart of FIG. 17. In the flowchart of FIG. 17, the control unit 230 executes the process of S104' in place of the process of S104 in the flowchart of FIG. 16.

In the determination operation of S104', the control unit 230 determines whether each of the plurality of patch sets is a first patch set or a second patch set on the basis of the patch information. In this determination operation, the control unit 230 acquires, as a patch set, a row of patches (hereinafter referred to as "patch row") in the patch chart C on the basis of the patch positions of patches in the patch information illustrated in the example of FIG. 3 and determines for each patch row whether the patch row subjected to the color measurements is a first patch set or a second patch set on the basis of the patch types of the patches in that row.

When the control unit 230 determines in the determination operation that the patch row subjected to the color measurements is a row of first patches C1, i.e., a first patch set (S104': YES), in S105 the control unit 230 executes the first color measuring operation. In this first color measuring operation, the control unit 230 controls the elevating unit 280 to move the color measuring unit 211 downward until the color measuring unit 211 contacts the print medium B, for example. Next, when the control unit 230 is measuring the colors of the first patches C1 in the first row f1 on the print medium B, i.e., when the first patches C1 in the first row f1 is determined to be a first patch set subjected to the color measurements in S104', the control unit 230 controls at least one of the conveying unit 250 and second carriage 270 to move the color measuring unit 211 until the color measuring unit 211 is disposed above or leftward of the first patch C1 positioned in the first column e1 and first row f1.

Subsequently, the control unit 230 controls the second carriage 270 to move the color measuring unit 211 along the first row f1 while the color measuring unit 211 remains in contact with the print medium B. Next, the control unit 230 moves the color measuring unit 211 over the first patches C1 in the first column e1 through thirty-sixth column e36 of the first row f1 without halting the movement of the color measuring unit 211 while measuring the color of each of these first patches C1 with the color measuring unit 211. In this way, the control unit 230 measures the color of each of the first patches C1 in the first column e1 through thirty-sixth column e36 of the first row f1 and stores the colorimetric value of each first patch C1 in the patch information of the storage unit 233 in association with the patch positions of the corresponding first patch C1. Subsequently, the control unit 230 controls at least one of the conveying unit 250 and second carriage 270 to move the color measuring unit 211 to a predetermined position on the print medium B or to the next patch row to be subjected to the color measurements.

On the other hand, when the control unit 230 determines in the determination operation that the patch row subjected to the color measurements is a row of second patches C2, i.e., a second patch set (S104': NO), in S106 the control unit 230 executes the second color measuring operation. In this second color measuring operation, when the control unit 230 is measuring the colors of the second patches C2 in the twenty-second row f22, i.e., when the second patches C2 in the twenty-second row f22 is determined to be a second patch set subjected to the color measurements in S4', for example, the control unit 230 controls at least one of the conveying unit 250 and second carriage 270 to move the color measuring unit 211 relative to the print medium B until the color measuring unit 211 is positioned above or leftward of the second patch C2 positioned in the twenty-second row f22 and first column e1.

Subsequently, the control unit 230 controls the second carriage 270 to move the color measuring unit 211 along the twenty-second row f22 while the color measuring unit 211 is spaced apart from the print medium B. At this time, the control unit 230 halts the horizontal movement of the color measuring unit 111 each time the color measuring unit 211 arrives at a predetermined position in each second patch C2 of the twenty-second row f22, such as the center of the second patch C2. While the horizontal movement of the color measuring unit 211 is halted relative to the print medium B, the control unit 230 moves the color measuring unit 211 in the up-down direction to bring the color measuring unit 211 into contact with the print medium B and measures the color of the second patch C2 with the color measuring unit 211 while the color measuring unit 211 is in contact with the print medium B rather than while the color measuring unit 211 is spaced apart from the print medium B.

Thus, for each second patch C2 in the first column e1 through thirty-sixth column e36 of the twenty-second row f22, the control unit 230 causes the color measuring unit to repeatedly move along the twenty-second row f22 while the color measuring unit 211 is spaced apart from the print medium B, halt in the center of each second patch C2, and measure the color of the second patch C2 while the color measuring unit 211 is in contact with the print medium B. In this way, the control unit 230 acquires the colorimetric value of each second patch C2 in the first column e1 through thirty-sixth column e36 of the twenty-second row f22 and stores the colorimetric values of the second patches C2 in the patch information stored in the storage unit 233 in association with the patch positions of the second patches C2. Subsequently, the control unit 230 causes the color measuring unit 211 to move in the up-down direction to bring the color measuring unit 111 spaced apart from the print medium B and controls at least one of the conveying unit 250 and second carriage 270 to move the color measuring unit 211 to a predetermined position relative to the print medium B or to the next patch row to be subjected to the color measurements.

Next, when there remain any patches to be measured (S107: NO), the control unit 230 returns to the process of S104' and repeats the process from S104' to S107. In the example of FIG. 14, the control unit 230 executes the first color measuring operation in S105 on patches in each of the first row f1 through twenty-first row f21. Furthermore, the control unit 230 executes the second color measuring operation of S106 on patches in each of the twenty-second row f22 and twenty-third row f23. Once all patches in the patch chart C have been measured (S107: YES), the control unit 230 ends the color measuring operations. These first and second color measuring operations can achieve an optimal balance between time and accuracy in measuring colors of patches on the basis of the patch types of patch sets. Furthermore, since the rows of first patches C1 and rows of second patches C2 in the patch chart C are arranged at different positions from each other in the front-rear direction, the first color measuring operation or second color measuring operation can be performed uniformly for individual rows.

Furthermore, when the print medium B has an upstream edge B1 and a downstream edge B2 relative to the conveying direction in which the print medium B is conveyed, i.e., the second direction, the control unit 230 may print the patch chart C on the print medium B in the printing operation so that the patch chart C is closer to the downstream edge B2 than to the upstream edge B1 in the conveying direction and the first patch sets are closer to the downstream edge B2 than the second patch sets to the downstream edge B2 in the patch chart. As illustrated in the examples of FIGS. 12 and 18, printing the patch chart C on the side of the print medium B closer to the color measuring unit 211 disposed forward of the head 240 can reduce the time between printing the patch chart C and measuring the colors of the patch chart C.

In the printing device 200 of the third embodiment, the arm 222 may also be provided on the second carriage 270, as illustrated in the example of FIG. 19. In this case, the white point 223 may be arranged on the second carriage 270. The arm 222 can move the color measuring unit 211 to the white point 223 so that the color measuring unit 211 can easily measure the color of the white point 223.

In the above description, the color measuring unit 211 measures the first patches C1 and second patches C2 while the color measuring unit 211 is in contact with the print medium B. However, the color measuring unit 211 may measure the colors of the first patches C1 and second patches C2 while the color measuring unit 211 is spaced apart from the print medium B.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiments and variations described above, the colors of the second patches C2 are measured while the color measuring unit 11, 111 or 211 is in contact with the print medium B in the second color measuring operation. However, the colors of the second patches C2 may be measured while the color measuring unit 11, 111 or 211 is in proximity to the print medium B, i.e., non-contact with the print medium B.

While an inkjet printer serves as an example of the printing unit 16 and printing devices 100 and 200 in the embodiments described above, the printing unit 16 and printing devices 100 and 200 may be another printer, such as a laser printer or a thermal printer. A laser printer is provided with a printing unit. The printing unit of a direct tandem laser printer includes an image carrying body such as a photosensitive drum or a photosensitive belt, a charging unit that charges the image carrying body through contact or non-contact, an exposure unit that forms an electrostatic latent image on the charged image carrying body using a laser semiconductor or the like (known as "exposure"), a toner cartridge or a developing cartridge that supplies toner to the image carrying body on which an electrostatic latent image has been formed, a transfer unit such as a transfer roller or a belt that transfers the developed toner image from the image carrying body directly to a print medium, and a fixing unit such as a fixing roller or a belt that thermally fixes the toner transferred onto the print medium.

The laser printer is not limited to a direct tandem laser printer but may be an intermediate transfer laser printer. The intermediate transfer laser printer first transfers the developed toner image from the image carrying body onto an intermediate transfer belt before using the transfer unit to transfer the toner image from the intermediate transfer belt onto the print medium. A thermal printer is also provided with a printing unit. The printing unit of a thermal printer includes a thermal head, and an ink ribbon. The thermal head contacts the ink ribbon and transfers ink in the ink ribbon onto a print medium by generating heat in selected heating elements.

In the example of FIGS. 1, 8, and 14, the patch chart C includes a twenty-first column e21 having 9 first patches C1 aligned in the front-rear direction, and a blank area C0 having no first patches C1 or second patches C2 formed on the front side of the twenty-first column e21. However, the arrangement of the second patches C2 in the patch chart C is not limited to this example. For example, 27 second patches C2 may be arranged in the twenty-first column e21 on the front side of the row of first patches C1, eliminating the blank area C0 from the patch chart C. In this case, the control units 30, 130 and 230 switch from the first color measuring operation to the second color measuring operation when moving from the 9 first patches C1 to the 27 second patches C2. Thus, this arrangement allows more second patches C2 to be measured.

In the example of FIGS. 7, 11 and 18, the patch chart C includes a twenty-first row f21 having 9 first patches C1 aligned in the left-right direction, and a blank area C0 having no first patches C1 or second patches C2 formed on the right side of the twenty-first row f21. However, the arrangement of the second patches C2 in the patch chart C is not limited to this example. For example, 27 second patches C2 may be arranged in the twenty-first row f21 on the right side of the row of first patches C1, eliminating the blank area C0 from the patch chart C. In this case, the control units 30, 130 and 230 switch from the first color measuring operation to the second color measuring operation when moving from the 9 first patches C1 to the 27 second patches C2. Thus, this arrangement allows more second patches C2 to be measured.

The present disclosure can be applied to a colorimetry system and a printing device that can achieve an optimal balance between processing time and accuracy in the color measurement of patches.

What is claimed is:

1. A printing device comprising:

a head having a nozzle configured to eject ink onto a print medium;

a first carriage configured to support the head, the first carriage being movable in a first direction;

a conveying unit configured to convey the print medium in a second direction crossing the first direction;

a color measuring unit configured to measure a color of each of a plurality of patches included in a patch chart printed on the print medium;

a second carriage configured to support the color measuring unit, the second carriage being movable in the first direction; and a controller, wherein the plurality of patches comprises: a first patch having a first color; and a second patch having a second color, and wherein the controller is configured to execute:

a printing operation to print the patch chart on the print medium with ink ejected from the head;

a determination operation for each of the plurality of patches, the determination operation for a target patch determining whether the target patch is the first patch or the second patch on a basis of patch information including information on the first patch and the second patch; and a color measuring operation for the plurality of patches, the color measuring operation comprising:

a first color measuring operation to measure a color of the first patch with the color measuring unit while the second carriage moves in the first direction; and a second color measuring operation to measure a color of the second patch with the color measuring unit while the second carriage halts in the first direction, wherein when the controller determines in the determination operation that the target patch is the first patch, the controller executes the first color measuring operation for the target patch, and wherein when the controller determines in the determination operation that the target patch is the second patch, the controller executes the second color measuring operation for the target patch.

2. The printing device according to claim 1, wherein the patch information includes information for each of the plurality of patches indicating: a patch position; and a patch type, the patch type of a patch indicating whether the patch is the first patch or the second patch.

3. The printing device according to claim 2, wherein the plurality of patches is configured in a plurality of patch sets, each of the plurality of patch sets having patches aligned in the first direction, the plurality of patch sets being juxtaposed in the second direction, the plurality of patch sets being configured of a first patch set and a second patch set, the first patch set being configured of a plurality of first patches aligned in the first direction, the second patch set being configured of a plurality of second patches aligned in the first direction, wherein the controller executes the determination operation for each of the plurality of patch sets, the determination operation for a target patch set determining whether the target patch set is the first patch set or the second patch set on the basis of the patch information, wherein when the controller determines in the determination operation that the target patch set is the first patch set, the controller executes the first color measuring operation for the target patch set to control the color measuring unit to measure colors of the plurality of first patches included in the target patch set while the second carriage moves the color measuring unit along the target patch set relative to the print medium in the first direction, and wherein when the controller determines in the determination operation that the target patch set is the second patch set, the controller executes the second color measuring operation for the target patch set to control the color measuring unit to measure colors of the plurality of second patches included in the target patch set while the second carriage repeatedly moves and halts the color measuring unit along the target patch set relative to the print medium in the first direction.

4. The printing device according to claim 3, wherein the first patch set and the second patch set are arranged at different positions from each other in the second direction.

5. The printing device according to claim 3, wherein the print medium has an upstream edge and a downstream edge in the second direction, and wherein in the printing operation, the controller prints the patch chart on the print medium so that the patch chart is closer to the downstream edge than to the upstream edge in the second direction and the first patch set is closer to the downstream edge than the second patch set is to the downstream edge in the patch chart.

6. The printing device according to claim 2, further comprising:

a reception unit configured to receive designation of the second color by a user, wherein the patch information also includes information on the patch position and the patch type of the second patch corresponding to the second color received by the reception unit.

7. The printing device according to claim 1, wherein the controller executes the first color measuring operation or the second color measuring operation while executing the printing operation.

8. The printing device according to claim 1, wherein the second carriage has a white point for calibrating the color measuring unit.

* * * * *